(12) United States Patent
Kondo et al.

(10) Patent No.: US 6,736,951 B2
(45) Date of Patent: May 18, 2004

(54) METHOD OF TREATING WASTE FROM NUCLEAR FUEL HANDLING FACILITY AND APPARATUS FOR CARRYING OUT THE SAME

(75) Inventors: Naruhito Kondo, Yokohama (JP); Reiko Fujita, Nerima-ku (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 29 days.

(21) Appl. No.: 09/940,932

(22) Filed: Aug. 29, 2001

(65) Prior Publication Data

US 2002/0005357 A1 Jan. 17, 2002

Related U.S. Application Data

(62) Division of application No. 09/393,317, filed on Sep. 10, 1999, now Pat. No. 6,299,748.

(30) Foreign Application Priority Data

Sep. 11, 1998  (JP) ............................................ 10/258093

(51) Int. Cl.[7] ................................. C25C 1/22; C25C 3/34
(52) U.S. Cl. ........................................... 205/47; 205/49
(58) Field of Search ................... 205/47, 49; 204/243.1

(56) References Cited

U.S. PATENT DOCUMENTS

| | | | |
|---|---|---|---|
| 3,607,145 A | 9/1971 | Wenz et al. ................. 23/325 |
| 3,802,871 A | 4/1974 | Lapat ............................ 75/93 |
| 3,982,928 A | 9/1976 | Chiotti et al. ............. 75/84.1 R |
| 4,596,647 A | 6/1986 | Miller et al. ................. 204/212 |
| 5,009,752 A | * | 4/1991 | Tomczuk et al. ............. 205/44 |
| 5,096,545 A | 3/1992 | Ackerman ................... 204/1.5 |
| 5,141,723 A | 8/1992 | Miller et al. .................... 423/5 |
| 5,147,616 A | 9/1992 | Ackerman et al. ............. 423/5 |
| 5,160,367 A | 11/1992 | Pierce et al. ................. 75/397 |
| 5,225,051 A | * | 7/1993 | Poa et al. ................... 205/402 |
| 5,322,545 A | * | 6/1994 | Gilchrist ....................... 75/399 |
| 5,336,450 A | 8/1994 | Ackerman et al. .......... 423/21.1 |
| 5,380,406 A | 1/1995 | Horton et al. ................ 204/1.5 |
| 5,454,914 A | 10/1995 | Gay ............................ 204/1.5 |
| 6,156,183 A | 12/2000 | Kondo et al. .................. 205/47 |

FOREIGN PATENT DOCUMENTS

| | | |
|---|---|---|
| EP | 0 068 469 | 5/1983 |
| GB | 968754 | 7/1962 |
| GB | 1 226 198 | 12/1968 |
| GB | 2 330 448 | 4/1999 |
| JP | 8-122487 | 5/1996 |
| JP | 9-152497 | 6/1997 |
| WO | WO 96/32729 | 4/1996 |

OTHER PUBLICATIONS

WPI Accession No. 97–360307 and JP 9152497, "Method and Device for Recovering Spent Nuclear Fuel Problem to be Solved", (1997). No month avail.

WPI Accession No. 96–290875 and JP 8122487, "Reprocessing Method of Spent Fuel and Annihilation Method Of Element Having Long Half–Life", (1996). No month avail.

WPI Accession No. 99–390484 and JP 11153684 A (Toshiba), Jun. 8, 1999.

* cited by examiner

*Primary Examiner*—Wesley A. Nicolas
(74) *Attorney, Agent, or Firm*—Foley & Lardner LLP

(57) ABSTRACT

A waste treatment apparatus treats radioactive contaminated waste from a nuclear fuel material handling facility to decontaminate the radioactive contaminated waste by using an electrolytic molten salt, and reuses the electrolytic molten salt so that any effluents are not produced. Radioactive contaminated waste (10) from a nuclear fuel material handling facility is subjected to electrolysis by a molten salt electrolysis unit (20) to decontaminate the waste (10). The used salt (16) used for decontaminating the waste (10) is filtered to separate nuclear fuel materials (19) from the used salt (16). The filtered salt (18) is reused by the molten salt electrolysis unit (20). The salt adhering to the decontaminated waste (12) is recovered by an evaporating unit (59), and the recovered salt (15) is reused by the molten salt electrolysis unit (20).

12 Claims, 20 Drawing Sheets

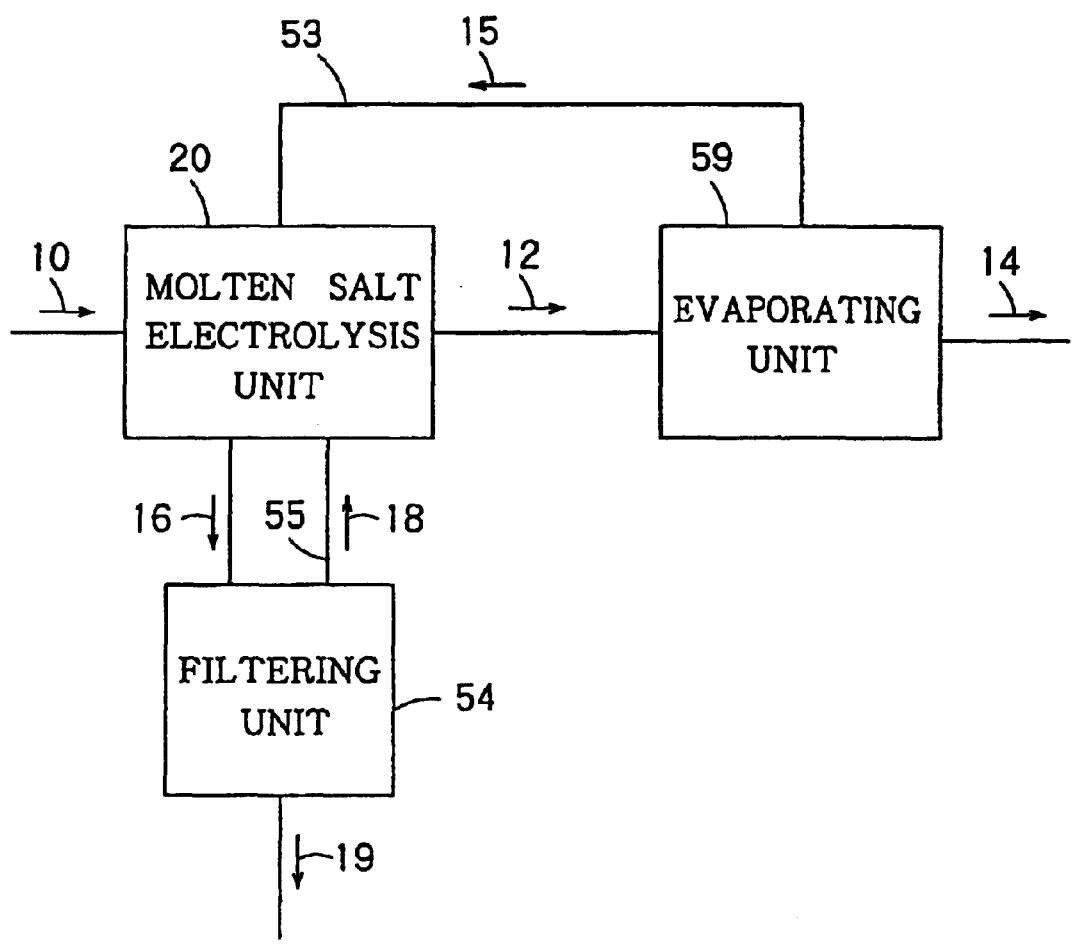
F I G. 1

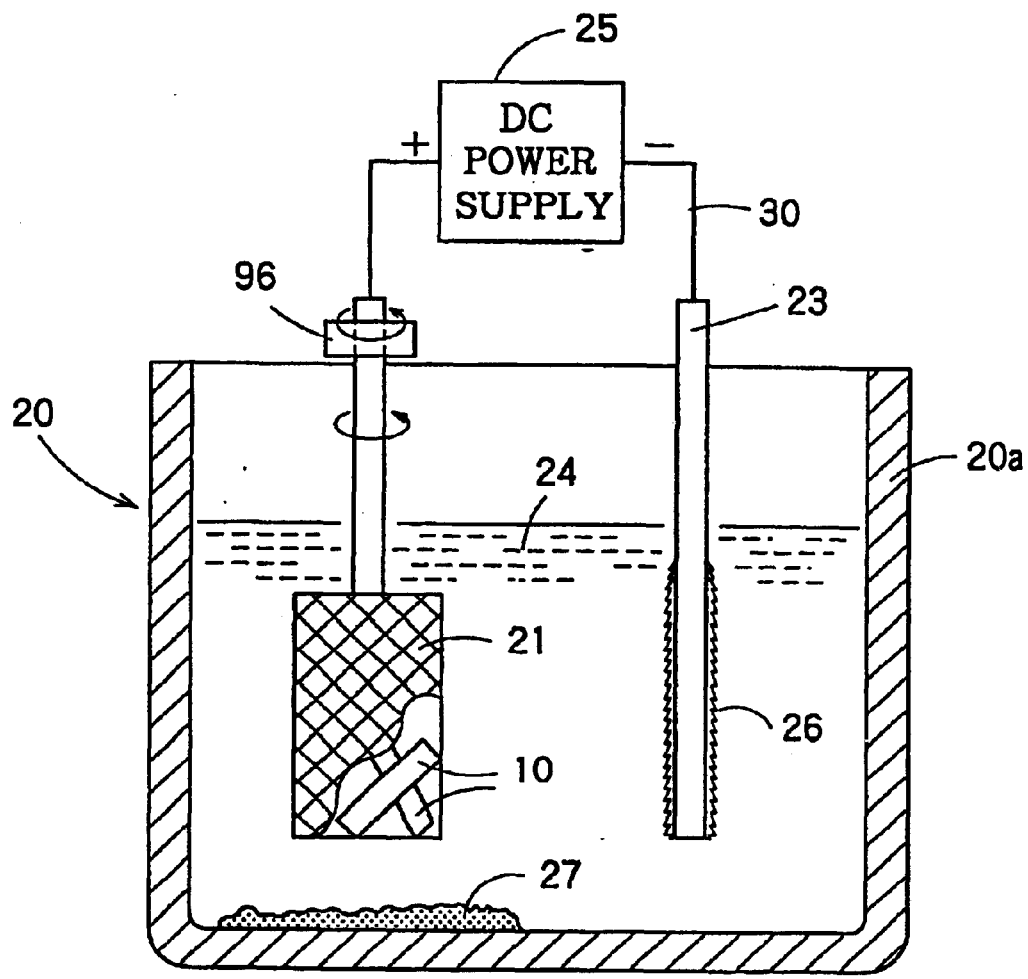
F I G. 2

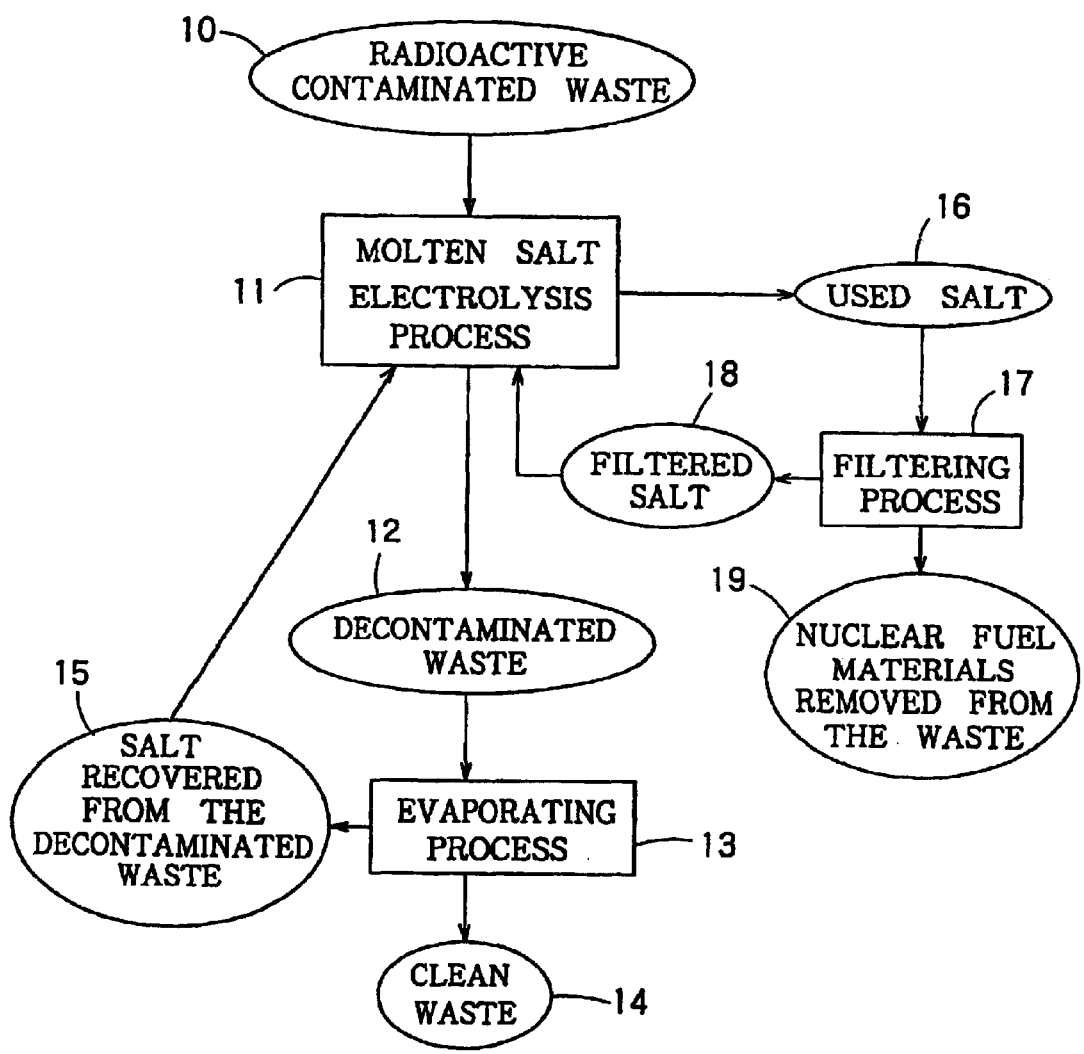
F I G. 4

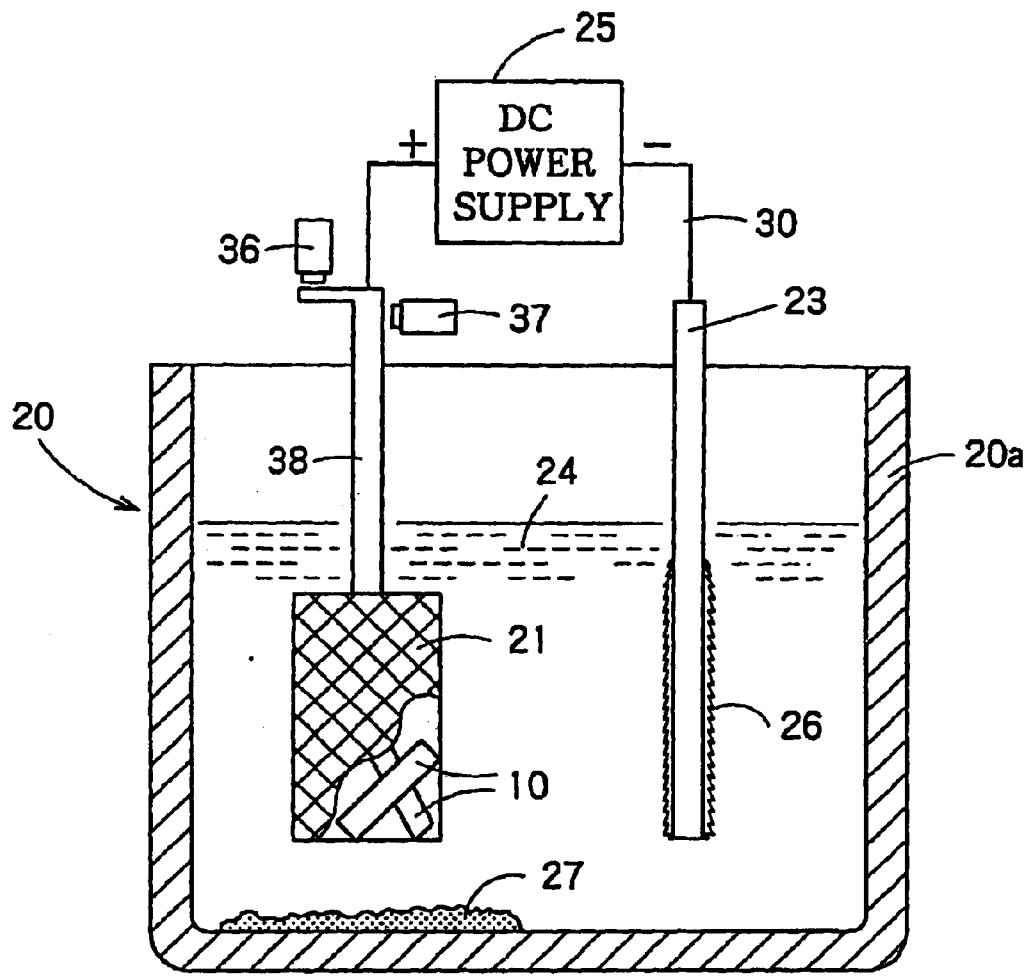
F I G. 6

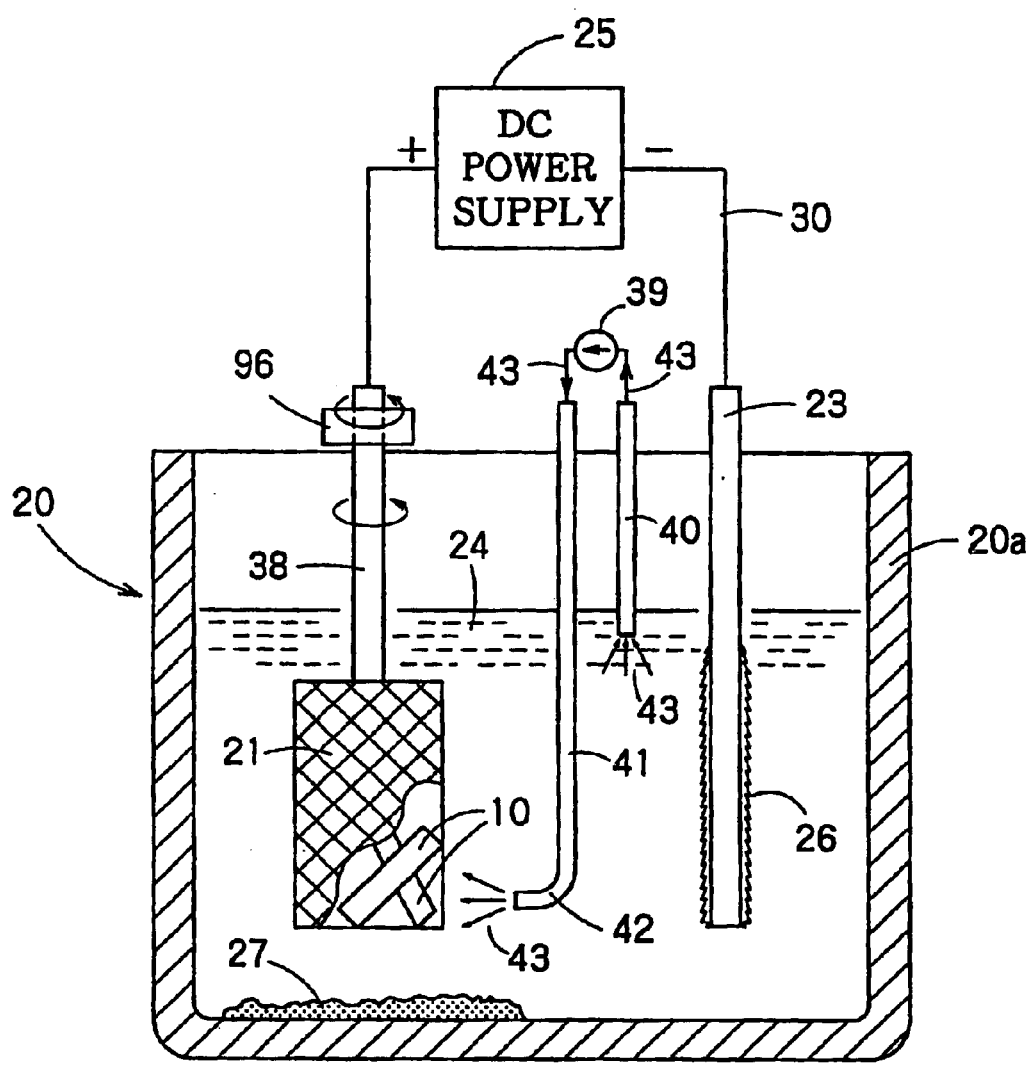
F I G. 7

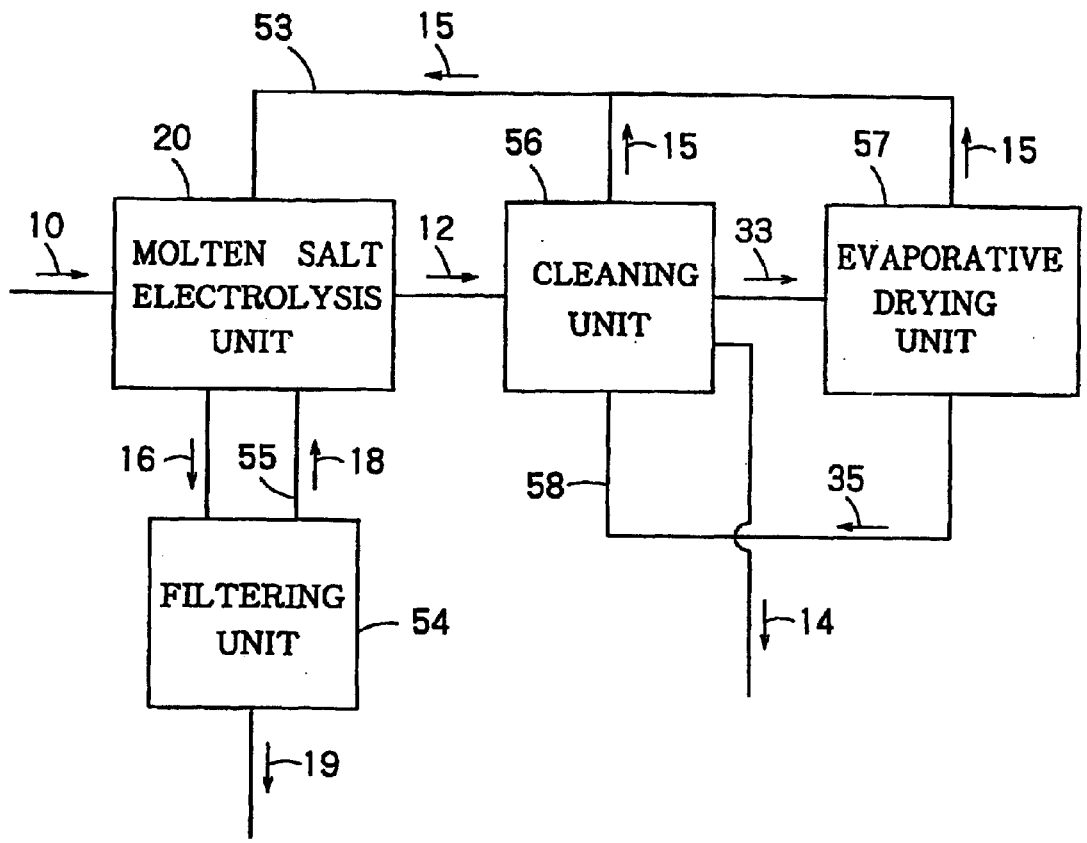
F I G. 8

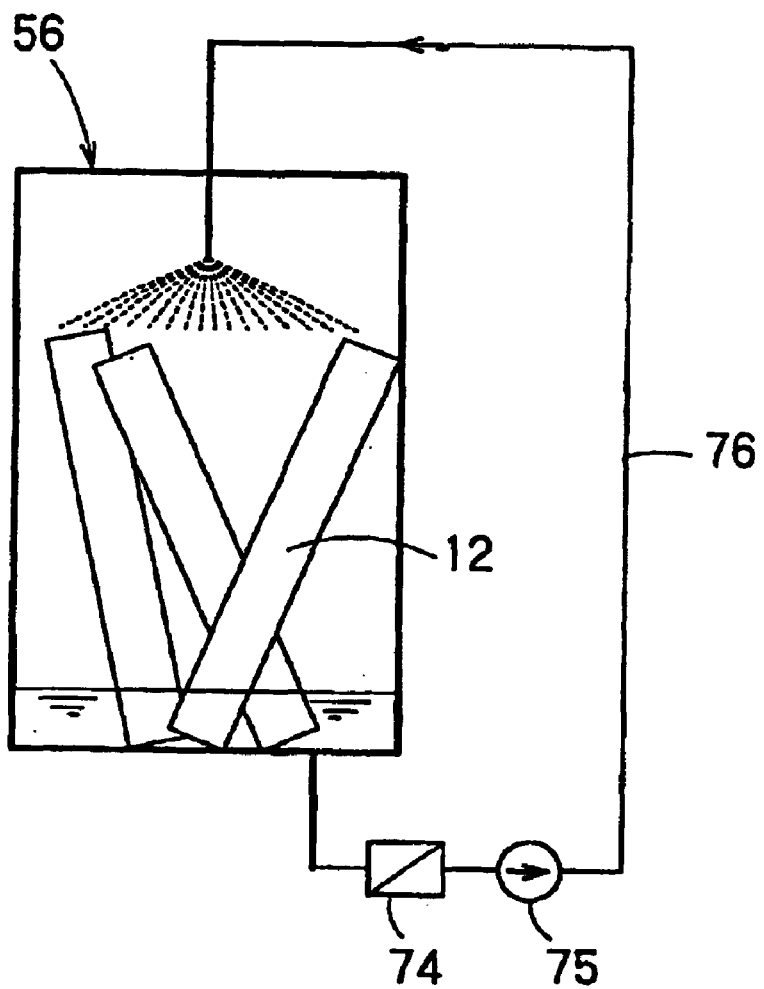
F I G. 9

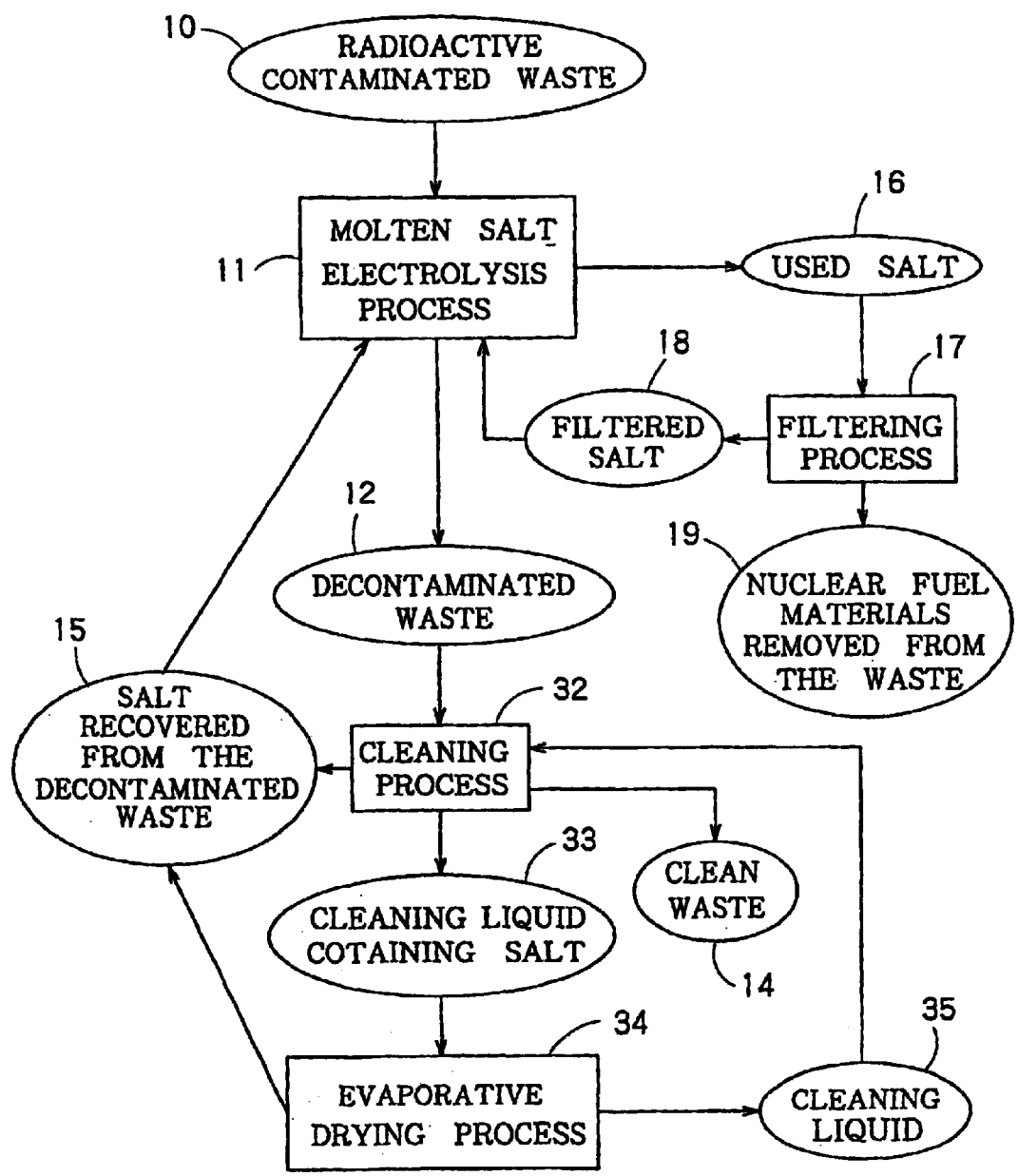
F I G. 10

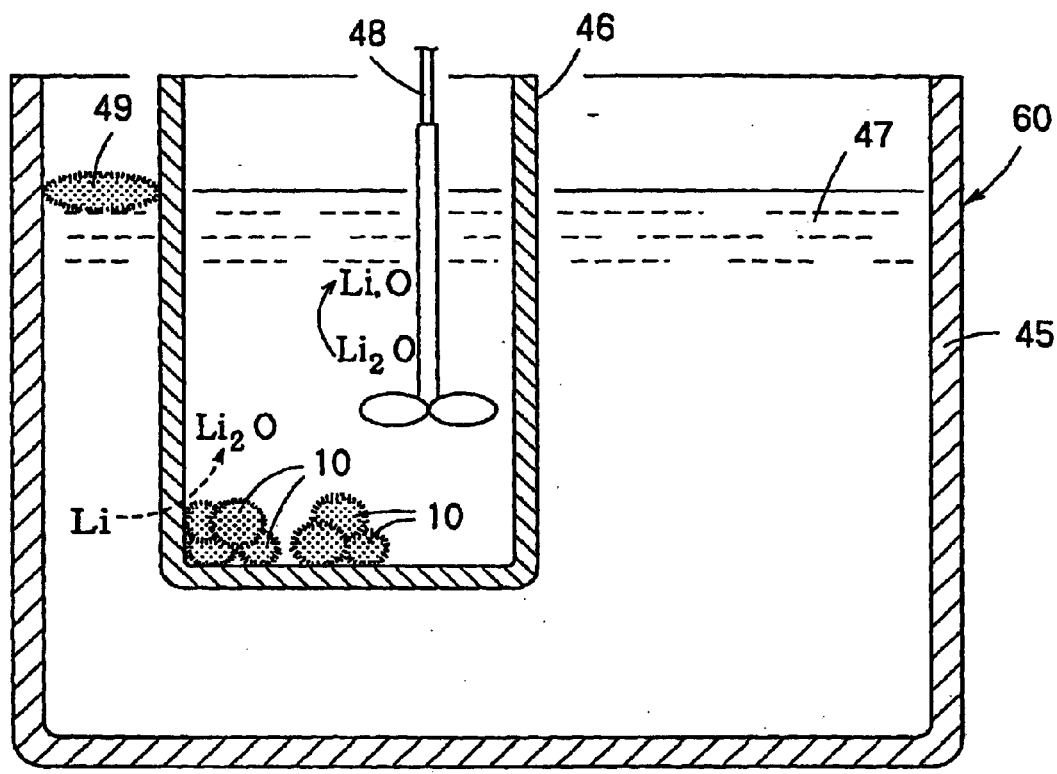
F I G. 12

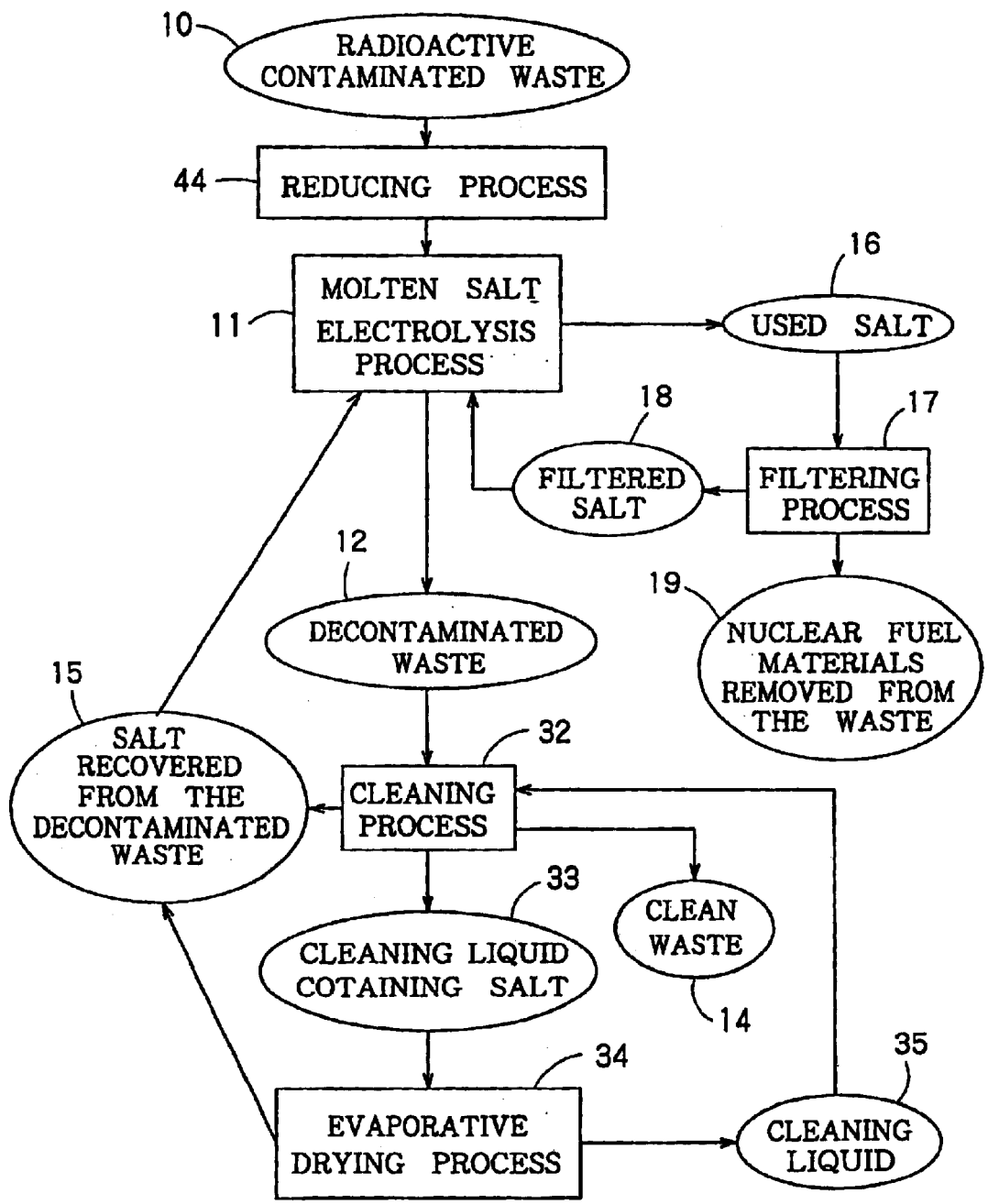
F I G. 13

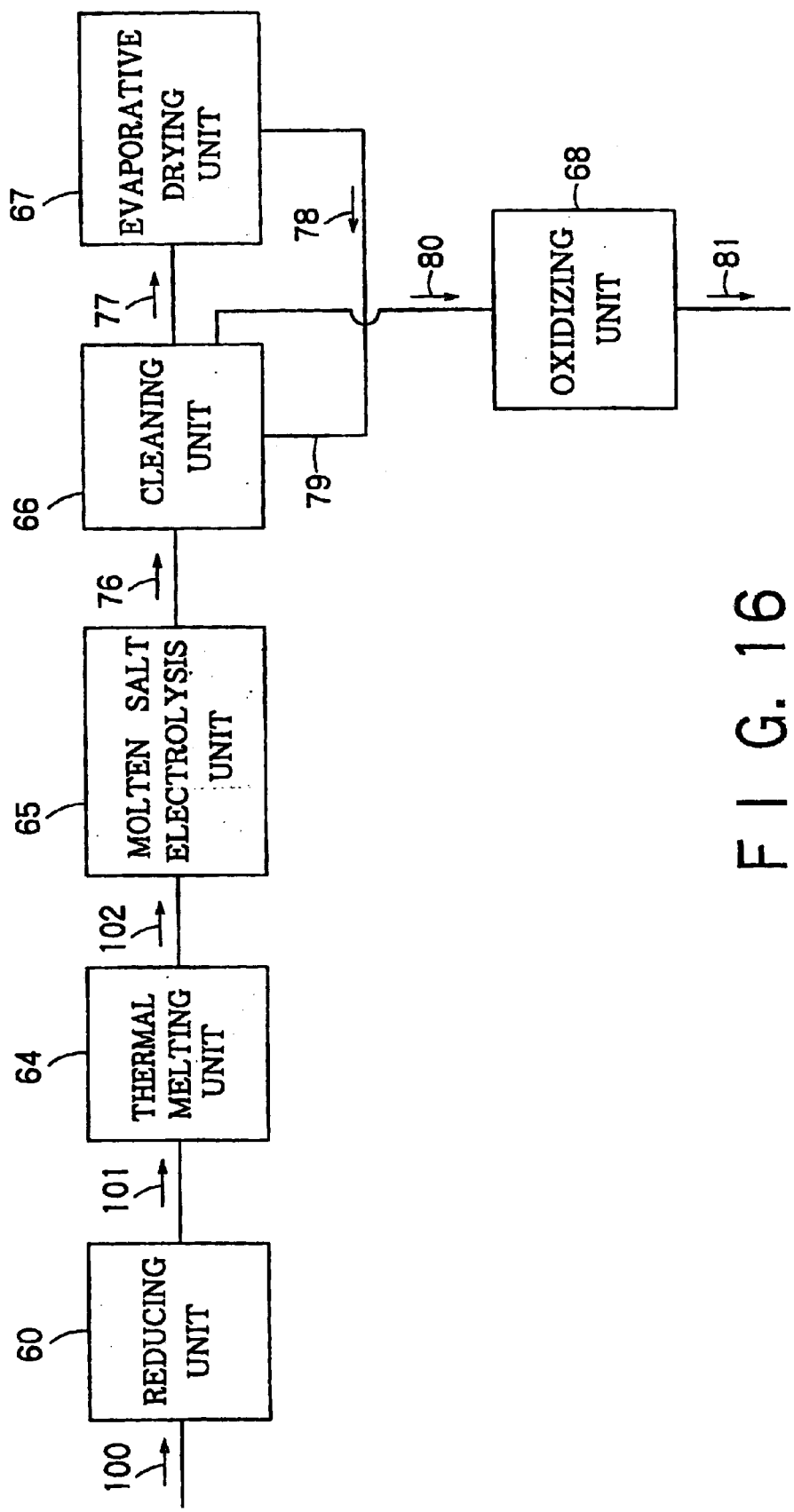
F I G. 16

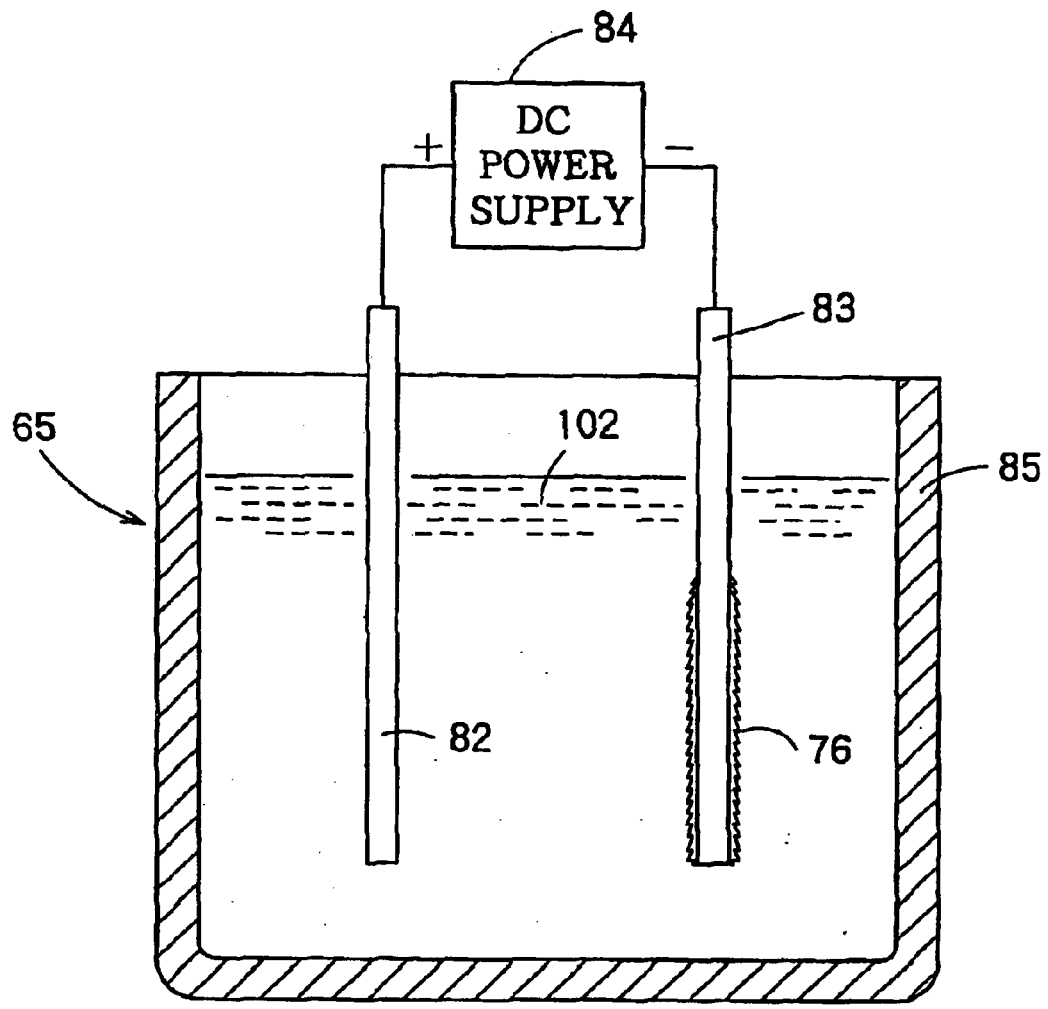
F I G. 17

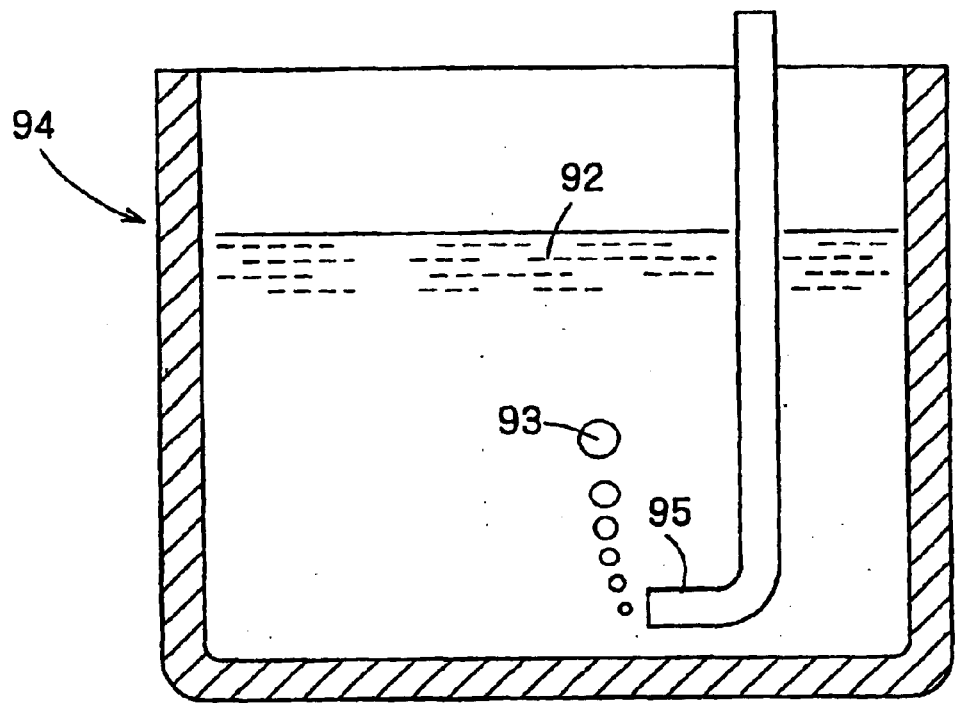
F I G. 19

METHOD OF TREATING WASTE FROM NUCLEAR FUEL HANDLING FACILITY AND APPARATUS FOR CARRYING OUT THE SAME

RELATED APPLICATIONS

This application is a divisional of U.S. patent application Ser. No. 09/393,317, filed on Sep. 10, 1999 now U.S. Pat. No. 6,299,748.

BACKGROUND OF THE INVENTION

1. Field of the Invention

The present invention relates to a method of treating electrically conductive waste contaminated with nuclear fuel materials and disposed from a nuclear fuel handling facility, and an apparatus for carrying out the method. More specifically, the present invention relates to a method of treating contaminated metallic waste produced when a nuclear fuel handling facility is dismantled, such as waste steel materials contaminated with nuclear fuel materials, or an adsorbent used for adsorbing nuclear fuel materials mounted in a nuclear fuel handling facility, and an apparatus for carrying out the method.

2. Description of the Related Art

FIG. 20 is a typical view of an apparatus for carrying out an electrolytic polishing process generally used for decontaminating waste contaminated with radioactive substances, such as nuclear fuel materials, (hereinafter referred to as "radioactive contaminated waste") by electrolysis. As shown in FIG. 20, a radioactive contaminated waste 3 is held by a holding device 2 and is immersed in an electrolytic solution contained in an electrolytic vessel 1 of a stainless steel. The radioactive contaminated waste 3 functions as an anode. A cathode 4 is immersed in the electrolytic water solution 5. When the radioactive contaminated waste 3 is a stainless steel waste, a phosphoric acid solution is used as the electrolytic water solution 5 serving as a bath. When the radioactive contaminated waste 3 is a carbon steel material, a sulfuric acid solution is used as the electrolytic water solution 5. The holding device 2 and the cathode 4 are connected to a dc power supply 6. When a dc voltage is applied across the holding device 2 and the cathode 4 by the dc power supply 6, the radioactive contaminated waste 3 functions as an anode. A surface layer of the radioactive contaminated waste 3 dissolves in the electrolytic water solution 5 simultaneously with coming off of radioactive contaminants adhering to the radioactive contaminated waste 3. Part of substances came off the radioactive contaminated waste 3 remains in the electrolytic water solution 5 and the rest is precipitated in sludge 8 on the bottom of the electrolytic vessel 1. Hydrogen 7 is produced on the cathode 4 of a stainless steel.

Generally, when decontaminating a radioactive contaminated waste by the electrolytic polishing process using the electrolytic water solution 5 as a bath, current is unable to flow uniformly over the entire surface of the radioactive contaminated waste when the radioactive contaminated waste has a complicated shape because the resistance of the bath is high. Consequently, the decontaminating effect of the electrolytic polishing process is reduced for some portions of the radioactive contaminated waste. If a high current is supplied to the bath to enhance electrolytic processing speed, heat is generated in the bath due to the high resistance of the bath. Hydrogen 7 produced on the cathode 4 during the electrolytic polishing process cause problems in safety. It is difficult to remove radioactive substances accumulated in the waste electrolytic water solution 5, particularly, radioactive substances dissolved in the waste electrolytic water solution 5 from the waste electrolytic water solution 5. The waste electrolytic solution 5 cannot be reused and becomes an additional radioactive contaminated waste. Thus, the total amount of radioactive contaminated waste increases.

The present invention has been made to solve those problems and it is therefore an object of the present invention to provide a method of treating waste from a nuclear fuel handling facility, capable of easily decontaminating a contaminated waste having a complicated shape, not discharging any effluent, capable of repeatedly using an electrolytic solution and not producing additional waste.

Another object of the present invention is to provide an apparatus for carrying out the foregoing method.

SUMMARY OF THE INVENTION

According to a first aspect of the present invention, a method of treating electrically conductive waste contaminated with nuclear fuel materials from a nuclear fuel handling facility comprises a molten salt electrolysis process for removing the nuclear fuel materials adhering to a surface of the waste by immersing the waste in a molten salt to dissolve a surface layer of the waste electrochemically in the molten salt; and a filtering process for filtering the molten salt used in the molten salt electrolysis process to extract the nuclear fuel materials removed from the surface of the waste and accumulated in the molten salt from the molten salt. The molten salt filtered in the filtering process is reused in the molten salt electrolysis process.

Preferably, the method further comprises an evaporation process for removing the molten salt adhering to a surface of the waste processed by the molten salt electrolysis process and taken out of the molten salt by heating the waste so that the molten salt adhering thereto evaporates. The molten salt recovered in the evaporation process is reused in the molten salt electrolysis process.

Preferably, the method further comprises a cleaning process for removing the molten salt adhering to the waste processed by the molten salt electrolysis process and taken out of the molten salt by a cleaning liquid, and an evaporative drying process for drying the molten salt contained in the cleaning liquid by evaporating the cleaning liquid used in the cleaning process. The molten salt recovered in the evaporative drying process is reused in the molten salt electrolysis process, and the cleaning liquid evaporated in the evaporative drying process is reused in the cleaning process.

Preferably, in the molten salt electrolysis process, the molten salt and the waste immersed in the molten salt are moved relative to each other to remove the nuclear fuel materials from the surface of the waste.

Preferably, in the molten salt electrolysis process, the waste is contained in a basket serving as an electrode for an electrolysis and the basket is vibrated in the molten salt.

Preferably, in the molten salt electrolysis process, the waste is contained in a basket serving as an electrode for an electrolysis and the basket is rotated in the molten salt.

Preferably, in the molten salt electrolysis process, the molten metal is spouted against the waste immersed in the molten salt.

Preferably, a liquid metal, which is in a liquid phase at a temperature high enough to maintain the molten salt in a molten state, is placed in the molten salt as an electrode for the molten salt electrolysis process.

Preferably, when the nuclear fuel materials are oxides, the method further comprises a reducing process for reducing the nuclear fuel materials to metals before subjecting the waste to the molten salt electrolysis process.

Preferably, in the reducing process, the nuclear fuel materials are reduced to metals by making the nuclear fuel materials react with a reducing agent.

Preferably, the reducing process comprises immersing the waste contaminated with the nuclear fuel materials in a reducing molten salt, supplying a reducing agent into the reducing molten salt, applying a voltage that will not cause a decomposition of the reducing molten salt across an anode and a cathode immersed in the reducing molten salt to regenerate the reducing agent reacted with the nuclear fuel materials.

Preferably, the reducing process comprises immersing the waste contaminated with the nuclear fuel oxides in a reducing molten salt, reducing the nuclear fuel oxides to metals by applying a voltage across an anode and a cathode immersed in the reducing molten salt for an electrolytic reduction.

According to a second aspect of the present invention, a method of treating an electrically conductive waste contaminated with nuclear fuel materials from a nuclear fuel handling facility comprises a reducing process for reducing the nuclear fuel materials to metals; a thermal melting process for producing a molten salt by heating and melting the metals produced by reducing the nuclear fuel materials and the waste; and a molten salt electrolysis process for recovering the metals produced by reducing the nuclear fuel materials and contained in the molten salt by applying a voltage across an anode and a cathode immersed in the molten salt so that the metals produced by reducing the nuclear fuel materials are deposited on the cathode.

Preferably, a chloride or a hydride having a same kind of cation as that of the molten salt is added to the molten salt to lower the melting point of the molten salt so that an operating temperature of the molten salt in the molten salt electrolysis process is lowered.

Preferably, the method further comprises a cleaning process for separating the nuclear fuel materials from the waste by cleaning the nuclear fuel materials deposited on the cathode in the molten salt electrolysis process and the waste with a cleaning liquid to dissolve the waste in the cleaning liquid; and an oxidation process for converting the nuclear fuel materials separated from the waste by the cleaning process into oxides by oxidizing the nuclear fuel materials; wherein the waste is an adsorbent used in the nuclear fuel material handling facility.

Preferably, the method further comprises an evaporative drying process for drying the adsorbent contained in the cleaning liquid by evaporating the cleaning liquid used in the cleaning process. The cleaning liquid evaporated by the evaporative drying process is reused in the cleaning process.

According to a third aspect of the present invention, an apparatus for treating an electrically conductive waste contaminated with nuclear fuel materials from a nuclear fuel handling facility comprises a molten salt electrolysis unit for removing the nuclear fuel materials adhering to a surface of the waste by immersing the waste in a molten salt to dissolve a surface layer of the waste electrochemically in the molten salt; a filtering unit for filtering the molten salt used by the molten salt electrolysis unit to extract the nuclear fuel materials removed from the surface of the waste and accumulated in the molten salt from the molten salt, and a molten salt return line for returning the molten salt filtered by the filtering unit to the molten salt electrolysis unit.

Preferably, the apparatus further comprises an evaporation unit for removing the molten salt adhering to a surface of the waste processed by the molten salt electrolysis unit and taken out of the molten salt by heating the waste so that the molten salt adhering thereto evaporates, and a molten salt return line for returning the molten salt removed from the surface of the waste by the evaporation unit to the molten salt electrolysis unit.

Preferably, the apparatus further comprises a cleaning unit for removing the molten salt adhering to the waste processed by the molten salt electrolysis unit and taken out of the molten salt by a cleaning liquid, and an evaporative drying unit for drying the molten salt contained in the cleaning liquid by evaporating the cleaning liquid used by the cleaning unit, a molten salt return line for returning the molten salt recovered by the evaporative drying unit to the molten salt electrolysis unit, and a cleaning liquid return line for returning the cleaning liquid evaporated by the evaporative drying unit to the cleaning unit.

Preferably, the molten salt electrolysis unit is provided with a driving mechanism for moving the molten salt and the waste immersed in the molten salt relative to each other.

Preferably, the molten salt electrolysis unit is provided further with a basket capable of containing the waste and serving as an electrode for an electrolysis, and the driving mechanism vibrates the basket in the molten salt.

Preferably, the molten salt electrolysis unit is provided further with a basket capable of containing the waste and serving as an electrode for an electrolysis, and the driving mechanism rotates the basket in the molten salt.

Preferably, driving mechanism includes a spouting means for spouting the molten salt against the waste immersed in the molten salt.

Preferably, the molten salt electrolysis unit is provided with an electrode formed from a liquid metal which is immersed in the molten salt and is in a liquid phase at a temperature high enough to maintain the molten salt in a molten state.

Preferably, when the nuclear fuel materials are oxides, the apparatus further comprises a reducing unit for reducing the nuclear fuel materials to metals.

According to a fourth aspect of the present invention, an apparatus for treating an electrically conductive waste contaminated with nuclear fuel materials from a nuclear fuel handling facility comprises a reducing unit for reducing the nuclear fuel materials to metals, a thermal melting unit for producing a molten salt by heating and melting the metals produced by reducing the nuclear fuel materials and the waste, and a molten salt electrolysis unit for recovering the metals produced by reducing the nuclear fuel materials and contained in the molten salt by applying a voltage across an anode and a cathode immersed in the molten salt so that the metals produced by reducing the nuclear fuel materials are deposited on the cathode.

Preferably, the waste is an adsorbent used for adsorbing the nuclear fuel materials in the nuclear fuel handling facility, and the apparatus further comprises a cleaning unit for separating the nuclear fuel materials from the waste by cleaning the nuclear fuel materials deposited on the cathode of the molten salt electrolysis unit and the waste with a cleaning liquid to dissolve the waste in the cleaning liquid, and an oxidation unit for converting the nuclear fuel materials separated from the waste by the cleaning unit into oxides by oxidizing the nuclear fuel materials.

Preferably, the apparatus further comprises an evaporative drying unit for drying the adsorbent contained in the cleaning liquid by evaporating the cleaning liquid used by the cleaning unit, and a cleaning liquid return line for returning the cleaning liquid recovered by the evaporative drying unit to the cleaning unit.

BRIEF DESCRIPTION OF THE DRAWINGS

The above and other objects, features and advantages of the present invention will become more apparent from the following description taken in connection with the accompanying drawings, in which:

FIG. 1 is a block diagram of a waste treatment apparatus in a first embodiment according to the present invention for treating waste from a nuclear fuel handling facility;

FIG. 2 is a schematic longitudinal sectional view of a molten salt electrolysis unit included in the waste treatment apparatus shown in FIG. 1;

FIG. 4 is a flow chart of a waste treatment method to be carried out by the waste treatment apparatus shown in FIG. 1;

FIG. 6 is a schematic longitudinal sectional view of a molten salt electrolysis unit in a second modification of the molten salt electrolysis unit included in the waste treatment apparatus shown in FIG. 1;

FIG. 7 is a schematic longitudinal sectional view of a molten salt electrolysis unit in a third modification of the molten salt electrolysis unit included in the waste treatment apparatus shown in FIG. 1;

FIG. 8 is a block diagram of a waste treatment apparatus in a second embodiment according to the present invention for treating waste from a nuclear fuel handling facility;

FIG. 9 is a schematic longitudinal sectional view of a cleaning unit included in the waste treatment apparatus shown in FIG. 8;

FIG. 10 is a flow chart of a waste treatment method to be carried out by the waste treatment apparatus in the second embodiment;

FIG. 12 is a schematic longitudinal sectional view of a reducing unit included in the waste treatment apparatus shown in FIG. 11;

FIG. 13 is a flow chart of a waste treatment method to be carried out by the waste treatment apparatus in the third embodiment;

FIG. 16 is a block diagram of a waste treatment apparatus in a fourth embodiment according to the present invention for treating waste from a nuclear fuel handling facility;

FIG. 17 is a schematic longitudinal sectional view of a molten salt electrolysis unit included in the waste treatment apparatus shown in FIG. 16;

FIG. 19 is a schematic longitudinal sectional view of a reducing unit in a modification of the reducing unit included in the waste treatment apparatus shown in FIG. 16.

DESCRIPTION OF THE PREFERRED EMBODIMENTS

Figure 3:
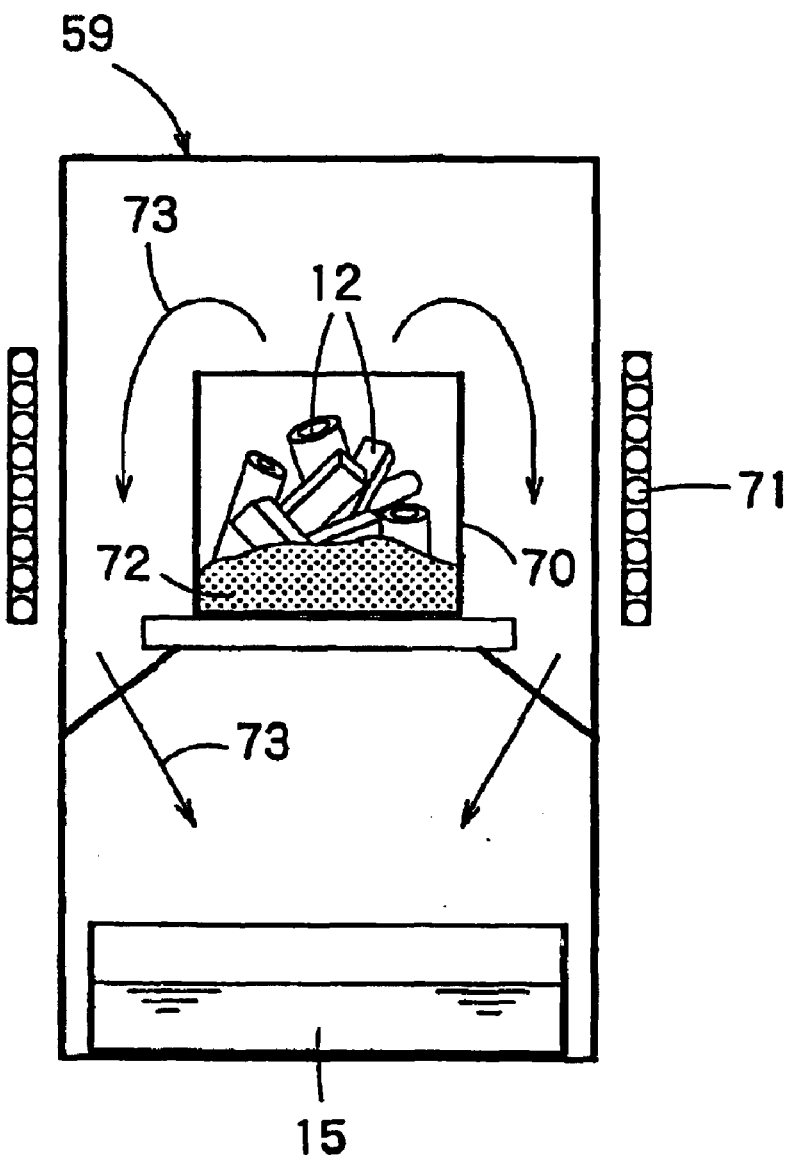
FIG. 3 is a schematic longitudinal sectional view of an evaporating unit included in the waste treatment apparatus shown in FIG. 1.

A waste treatment apparatus in a first embodiment according to the present invention and a waste treatment method to be carried out by the same waste treatment apparatus will be described hereinafter.

Nuclear fuel handling facilities include uranium mining facilities, uranium refining facilities, conversion plants, enrichment plants, nuclear fuel processing plants, nuclear reactors, reprocessing plants, waste disposal facilities, and transportation facilities for transporting nuclear fuel materials between those facilities and plants.

Waste from nuclear fuel handling facilities includes various steel materials that are produced when nuclear fuel handling facilities are dismantled, and adsorbents which are used for arresting nuclear fuel materials in nuclear fuel handling facilities. The waste treatment apparatus in the first embodiment is suitable for treating contaminated metal wastes, such as contaminated steel materials, or contaminated metal waste cut into small pieces by a pretreatment process.

Nuclear fuel materials include uranium, uranium ores, uranium oxides, uranium chloride, uranium fluoride, uranium hydride, uranium nitrate and uranium sulfate.

Referring to FIGS. 1 and 2, the waste treatment apparatus has a molten salt electrolysis unit 20 for decontaminating radioactive contaminated waste 10 from a nuclear fuel handling facility by molten salt electrolysis using a molten salt 24. The salt 24 adheres to the decontaminated waste 12 decontaminated by the molten salt electrolysis unit 20. The salt 24 adhering to the decontaminated waste 12 is separated from the waste 12 by an evaporation unit 59. The evaporation unit 59 melts and evaporates the salt 24 by heating the salt 24 adhering to the waste 12 at a temperature not lower than its melting point to separate the salt 24 from the waste 12. The evaporation unit 59 is a known evaporation device used in chemical engineering. The waste treatment apparatus has a recovered salt return line 53 for returning the recovered salt 15 separated from the decontaminated waste 12 and recovered by the evaporating unit 59 to the molten salt electrolysis unit 20. The recovered salt return line 53 may be of either a transfer pipe type or a conveyor type.

The waste treatment apparatus has a filtering unit 54 for filtering the used salt 16 from the molten salt electrolysis unit 20 to filter out nuclear fuel materials 19 from the used salt 16 to provide the filtered salt 18. The filtering unit 54 may be a filtering device generally used in chemical engineering and capable of separating the nuclear fuel materials 19 and the filtered salt 18 by subjecting the used salt 16 to filtration.

The waste treatment apparatus has a filtered salt return line 55 for returning the filtered salt 18 to the molten salt electrolysis unit 20. The filtered salt return line 55 may be of either a transfer pipe type or a conveyor type.

Referring to FIG. 2, the molten salt electrolysis unit 20 has an electrolytic vessel 20a made of a low-carbon steel, an anode basket 21 which is a mesh structure of a low-carbon steel or a stainless steel, placed in the electrolytic vessel 20a, and a driving device 96. The basket 21 is driven for rotation in a molten salt 24 contained in the electrolytic vessel 20a by the driving device 96 to promote electrolytic reaction by moving the radioactive contaminated waste 10 contained in the basket 21 relative to the molten salt 24.

The anode basket 21 containing the radioactive contaminated waste 10 contaminated with nuclear fuel materials is immersed in the molten salt 24. A cathode 23 of a low-carbon steel is immersed in the molten salt 24. A dc power supply 25 has a positive electrode and a negative electrode connected to the anode basket 21 and the cathode 23, respectively. In FIG. 2, indicated at 26 is a cathodic deposit and at 27 is sludge.

The molten salt 24 is an electrolyte prepared by melting one of chemical compounds including an alkali metal chloride, an alkaline earth metal chloride, an alkali metal fluoride, an alkaline earth metal fluoride, a chloride or fluoride of an element included in the component elements of the waste 10, or a mixture of some of those chemical compounds, and keeping the molten salt at a temperature not lower than its melting point.

Referring to FIG. 3, the evaporating unit 59 has a melting crucible 70 for heating the decontaminated waste 12 decontaminated by the molten salt electrolysis unit 20 and soiled with the salt 24, and an induction heating coil 71 surrounding the melting crucible 70. The decontaminated waste 12 contained in the melting crucible 70 is heated. Consequently, the decontaminated waste 12 melts into molten waste 72 and the salt 24 adhering to the decontaminated waste 12 evaporates in a gas phase. The salt 24 in a gas phase flows in the direction of the arrows 73 and is recovered to obtain the recovered salt 15 in a liquid phase.

A method of treating the radioactive contaminated waste 10 from a nuclear fuel handling facility to be carried out by the waste treatment apparatus in the first embodiment shown in FIGS. 1 to 3 will be described with reference to FIGS. 1 to 4.

Referring to FIG. 4, a molten salt electrolysis process 11 puts the radioactive contaminated waste 10 from the nuclear fuel handling facility in the anode basket 21 and immerses the anode basket 21 in the molten salt 24 contained in the electrolytic vessel 20a of the molten salt electrolysis unit 20. A current is supplied through the radioactive contaminated waste 10 functioning as an anode, and the cathode 23 to dissolve electrochemically a surface layer of the radioactive contaminated waste 10 contaminated with nuclear fuel materials in the molten salt 24 to provide decontaminated waste 12. When a dc voltage is applied across the anode basket 21 and the cathode 23 by the dc power supply 25, the radioactive contaminated waste 10 functions as an anode, and the surface layer of the radioactive contaminated waste 10 dissolves in the molten salt 24. Consequently, the nuclear fuel materials adhering to the surface of the contaminated waste 10 fall into the molten salt 24, and sludge of the nuclear fuel materials deposits on the bottom of the electrolytic vessel 20a of the molten salt electrolysis unit 20. Ions of the component metals of the radioactive contaminated waste 10 are reduced and cathodic deposit 26 deposits on the cathode 23.

The decontaminated waste 12 is soiled with the salt 24 used by the molten salt electrolysis process 11. The salt 24 adhering to the decontaminated waste 12 is removed from the decontaminated waste 12 by an evaporation process 13 using the evaporating unit 59. The evaporation process 13 heats the decontaminated waste 12 at a temperature not lower than the melting point of the salt 24 in an environment of the atmospheric pressure or a reduced pressure to evaporate the salt 24 from the decontaminated waste 12. Thus clean waste 14 is obtained. The recovered salt 15 is returned through the recovered salt return line 53 to the molten salt electrolysis unit 20 and is reused for the molten salt electrolysis process 11. Thus, the salt 15 is removed from the decontaminated waste 12 to obtain the clean waste 14. In the evaporation process 13, the decontaminated waste 12 can be melted to reduce the same to a metal ingot by heating the decontaminated waste 12 at a temperature higher than its melting point during or after the removal of the salt 24 from the decontaminated waste 12.

The used salt 16 used in the molten salt electrolysis process 11 contains sludge of the nuclear fuel materials 19 removed from the radioactive contaminated waste 10. A filtering process 17 filters out the sludge from the used salt 16 by the filtering unit 54. The filtered salt 18 thus filtered by the filtering unit 54 is returned through the filtered salt return line 55 to the molten salt electrolysis unit 20 and is reused for the molten salt electrolysis process 11.

Figure 5:
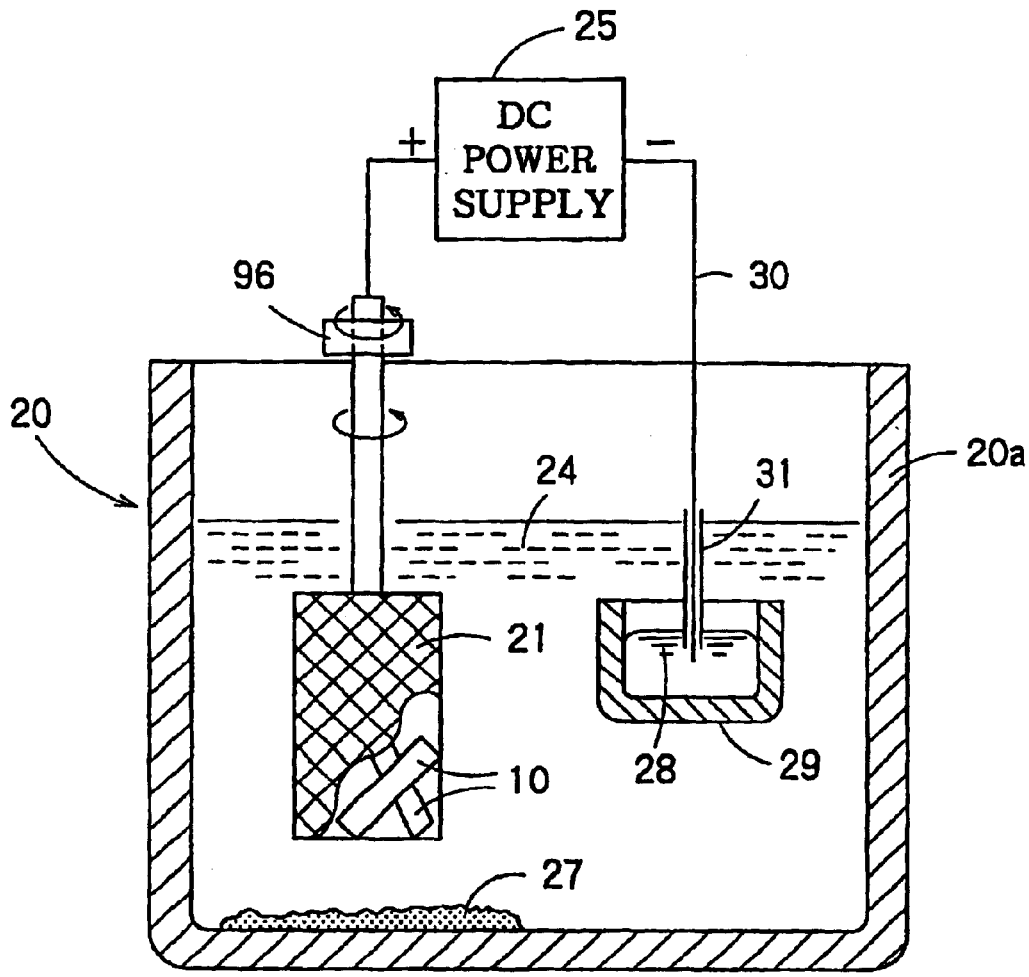
FIG. 5 is a schematic longitudinal sectional view of a molten salt electrolysis unit in a first modification of the molten salt electrolysis unit included in the waste treatment apparatus shown in FIG. 1.

A molten salt electrolysis unit 20 in a first modification of the molten salt electrolysis unit 20 shown in FIG. 2 will be described with reference to FIG. 5, in which parts like or corresponding to those of the molten salt electrolysis unit 20 shown in FIG. 2 are designated by the same reference characters and the description thereof will be omitted. The molten salt electrolysis unit 20 shown in FIG. 5 is provided with a liquid metal 28 instead of the solid cathode 23 shown in FIG. 2. The liquid metal 28 serves as a cathode. The liquid metal 28 is in a liquid phase at the temperature of the melting point of the molten salt 24. The liquid metal 28 is contained in an electrically insulating ceramic pot 29, and the ceramic pot 29 containing the liquid metal 28 is immersed in the molten salt 24. A cathode wire 30 has one end dipped in the liquid metal 28 and the other end connected to the dc power supply 25. The liquid metal 28 may be stirred by a stirring device to promote the mixing of the cathodic deposit deposited on the surface of the liquid metal 28 with the liquid metal 28. The cathode wire 30 is extended through an electrically insulating ceramic tube 31 to insulate the same from the molten salt 24. Ions of the component metals of the radioactive contaminated waste 10 are reduced on the surface of the liquid metal 28 and the cathode deposit is deposited on the surface of the liquid metal 28.

A molten salt electrolysis unit 20 in a second modification of the molten salt electrolysis unit 20 shown in FIG. 2 will be described with reference to FIG. 6, in which parts like or corresponding to those of the molten salt electrolysis unit 20 shown, in FIG. 2 are designated by the same reference characters and the description thereof will be omitted. The molten salt electrolysis unit 20 shown in FIG. 6 is provided with actuators 36 and 37 for vibrating the anode basket 21. The anode basket 21 is held by an anode basket holding bar 38. The actuator 36 vibrates the anode basket holding bar 38 in vertical directions, and the actuator 47 vibrates the same in horizontal directions. The actuators 36 and 37 are used selectively to vibrate the anode basket holding bar 38 at an optional frequency in horizontal directions, vertical directions or in both vertical and horizontal directions to promote the separation of the nuclear fuel material from the surface of the radioactive contaminated waste 10.

A molten salt electrolysis unit 20 in a third modification of the molten salt electrolysis unit 20 shown in FIG. 2 will be described with reference to FIG. 7, in which parts like or corresponding to those of the molten salt electrolysis unit 20 shown in FIG. 2 are designated by the same reference characters and the description thereof will be omitted. The molten salt electrolysis unit 20 shown in FIG. 7 is provided with a cleaning device for cleaning the surface of the radioactive contaminated waste 10 in the molten salt 24. The cleaning device has a molten salt suction pipe 40, a molten salt jetting pipe 41 provided with a molten salt jetting nozzle 42, and a pump 39. The molten salt suction pipe 40 and the molten salt jetting pipe 41 are connected to the inlet port and the outlet port of the pump 39, respectively. The pump 39 operates to suck the molten salt 24 through the molten salt suction pipe 40 and to clean the radioactive contaminated waste 10 contained in the anode basket 21 by jetting the molten salt 24 through the molten salt jetting nozzle 42 against the radioactive contaminated waste 10. In FIG. 7 the arrows 43 indicate the flow of the molten salt 24.

As apparent from the foregoing description, the waste treatment apparatus in the first embodiment decontaminates the radioactive contaminated waste 10 contaminated with the nuclear fuel materials by the molten salt electrolysis unit 20, removes the salt 24 adhering to the decontaminated waste 12 by heating the decontaminated waste 12 in the environment of the atmospheric pressure or a reduced pressure to evaporate the salt 24 by the evaporating unit 59. Thus, the salt 24 adhering to the decontaminated waste 12 can easily be removed from the decontaminated waste 12 to obtain the clean waste 14. The recovered salt 15 recovered by the evaporating unit 59 can be returned through the recovered salt return line 53 to the molten salt electrolysis unit 20 to reuse the same. The used salt 16 is filtered and the filtered salt 18 can be returned through the filtered salt return line 55 to the molten salt electrolysis unit 22 to reuse the same.

A waste treatment apparatus in a second embodiment according to the present invention for treating radioactive contaminated waste from a nuclear fuel handling facility will be described hereinafter. The waste treatment apparatus in the second embodiment is a modification of the waste treatment apparatus in the first embodiment. Parts of the waste treatment apparatus in the second embodiment like or corresponding to those of the waste treatment apparatus in the first embodiment are designated by the same reference characters and the description thereof will be omitted.

Referring to FIG. 8, the waste treatment apparatus in the second embodiment is provided with a cleaning unit 56 instead of the evaporating unit 59 of the waste treatment apparatus in the first embodiment, and is provided additionally with an evaporative drying unit 57 and a cleaning liquid return line 58. The cleaning unit 56 cleans the decontaminated waste 12 with a cleaning liquid, such as water. The recovered cleaning liquid recovered by the evaporative drying unit 57 is returned through the cleaning liquid return line 58 to the cleaning unit 56. The recovered salt 15 recovered by the evaporative drying unit 57 is returned through the recovered salt return line 53 to the molten salt electrolysis unit 20 to reuse the same.

Referring to FIG. 9, the cleaning unit 56 has a filter 74 for filtering the cleaning liquid, and a pump 75 for spraying the filtered cleaning liquid on the decontaminated waste 12 decontaminated by the molten salt electrolysis unit 20.

A waste treatment method using the waste treatment apparatus shown in FIGS. 8 and 9 will be described with reference to FIGS. 8 to 10. As shown in FIG. 10, the waste treatment method has a cleaning process 32 instead of the waste treatment method shown in FIG. 4. The cleaning process 32 cleans the decontaminated waste 12 decontaminated by the molten salt electrolysis process 11 of the salt 24 adhering to the decontaminated waste 12 with a cleaning liquid containing at least one of liquids including water, a nitric acid solution, a sulfuric acid solution and a hydrochloric acid solution. The used cleaning liquid 33 containing the salt 24 and discharged from the cleaning unit 56 is subjected to evaporation by the evaporative drying unit 57 to recover the salt 24 by evaporative drying. The recovered salt 15 is returned to the molten salt electrolysis unit 20 to reuse the same in the molten salt electrolysis process 11. The cleaning liquid 35 recovered by the evaporative drying process 34 is returned through the cleaning liquid return line 58 to the cleaning unit 56 to reuse the same in the cleaning process 32.

As apparent from the foregoing description, the waste treatment apparatus in the second embodiment is capable of readily removing the salt 24 adhering to the decontaminated waste 12 by the cleaning unit 56 after the radioactive contaminated waste 10 contaminated with the nuclear fuel materials has been decontaminated by the molten salt electrolysis unit 20. The recovered salt 15 recovered by the evaporative drying unit 57 is returned through the recovered salt return line 53 to the molten salt electrolysis unit 20 and can be reused. The used salt 16 used by the molten salt electrolysis unit 20 is filtered by the filtering unit 54 to recycle the filtered salt 18. The filtered salt 18 is returned through the filtered salt return line 55 to the molten salt electrolysis unit 20 and can be reused in the molten salt electrolysis process 11. The cleaning liquid 35 recovered by the evaporative drying unit 57 is returned through the cleaning liquid return line 58 to the cleaning unit 56. Thus, the cleaning liquid 35 can efficiently be reused and hence additional effluents are not produced.

A waste treatment apparatus in a third embodiment according to the present invention for treating radioactive contaminated waste from a nuclear fuel handling facility, and a waste treatment method to be carried out by the same waste treatment apparatus will be described hereinafter. The waste treatment apparatus in the third embodiment is a modification of the waste treatment apparatus in the second embodiment. Parts of the waste treatment apparatus in the third embodiment like or corresponding to those of the waste treatment apparatus in the second embodiment are designated by the same reference characters and the description thereof will be omitted.

Figure 11:
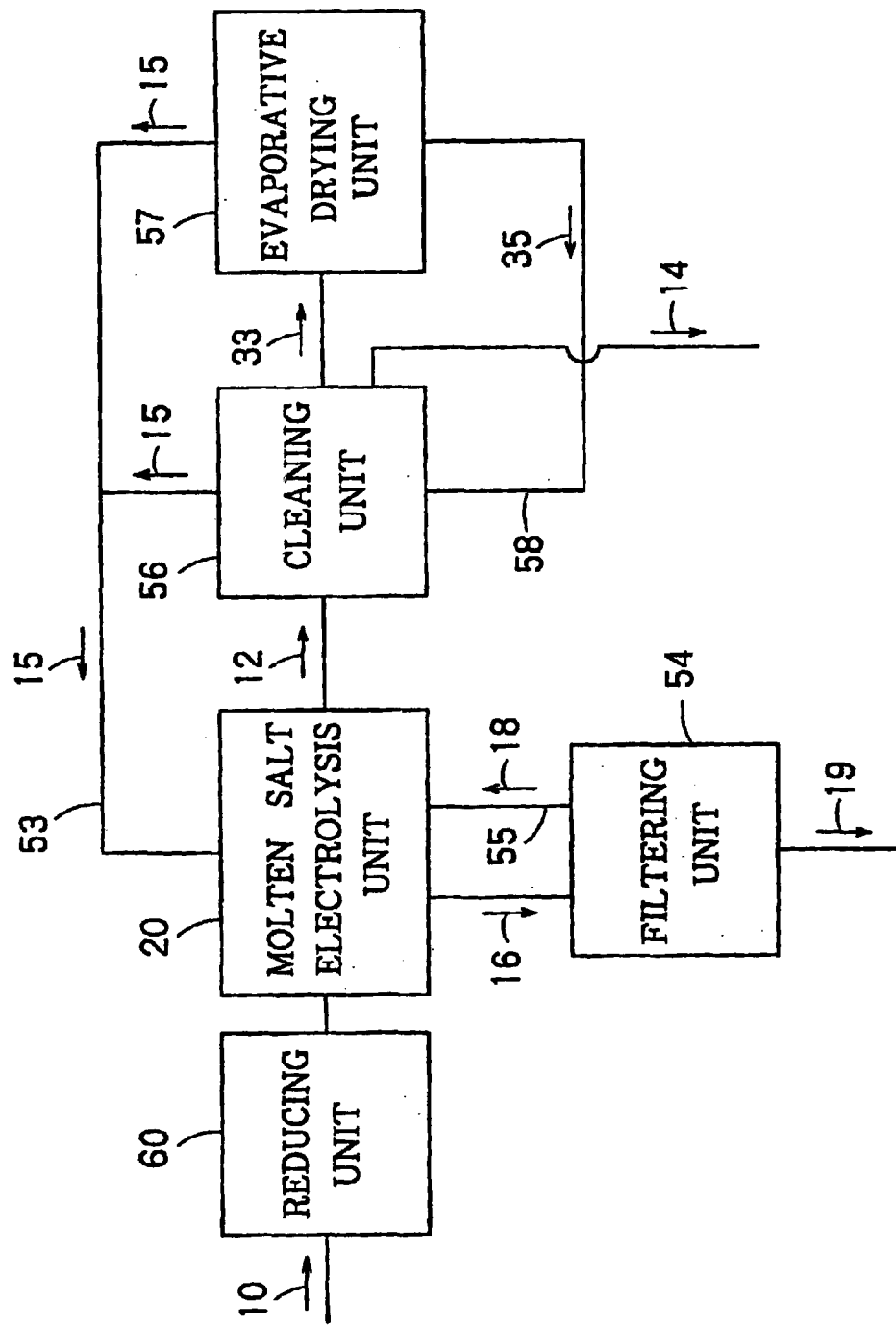
FIG. 11 is a block diagram of a waste treatment apparatus in a third embodiment according to the present invention for treating waste from a nuclear fuel handling facility.

Referring to FIG. 11, the waste treatment apparatus in the third embodiment has a reducing unit 60 disposed on the upstream side of the molten salt electrolysis unit 20. When the nuclear fuel materials adhering to the waste 10 are uranium ore or oxides, the reducing unit 60 reduces the nuclear fuel materials prior to the treatment of the waste 10 by the molten salt electrolysis unit 20 for the efficient molten salt electrolysis of the waste 10.

Referring to FIG. 12, the reducing unit 60 has a reaction vessel 45 containing a molten salt 47, a meshed waste container 46 placed in the reaction vessel 45 to contain the waste 10, and a stirring device 48 inserted in the waste container 46. A reducing agent 49 is supplied into the reaction vessel 45. The reducing agent 49 is lithium (Li), magnesium (Mg) or calcium (Ca). Preferably, the reducing agent 49 is Li. The waste 10 from a nuclear fuel material handling facility is put into the waste container 46. The reducing agent 49, such as Li, comes into direct contact with the waste 10 for reducing reaction.

A waste treatment method to be carried out by the waste treatment apparatus in the third embodiment shown in FIGS.

11 and 12 will be described with reference to FIGS. 11 to 13. The waste treatment method comprises a reducing process 44 in addition to the processes of the waste treatment method to be carried out by the waste treatment apparatus in the second embodiment. The waste treatment method carries out the reducing process 44 by the reducing unit 60 before the molten salt electrolysis process 11. The reducing process 44 reduces the nuclear fuel materials adhering to the waste 10 to metals through the direct interaction of the reducing agent 49 and the nuclear fuel materials. The waste 10 thus treated by the reducing process 44 is subjected to processes entirely the same as those of the waste treatment method shown in FIG. 10.

Figure 14:
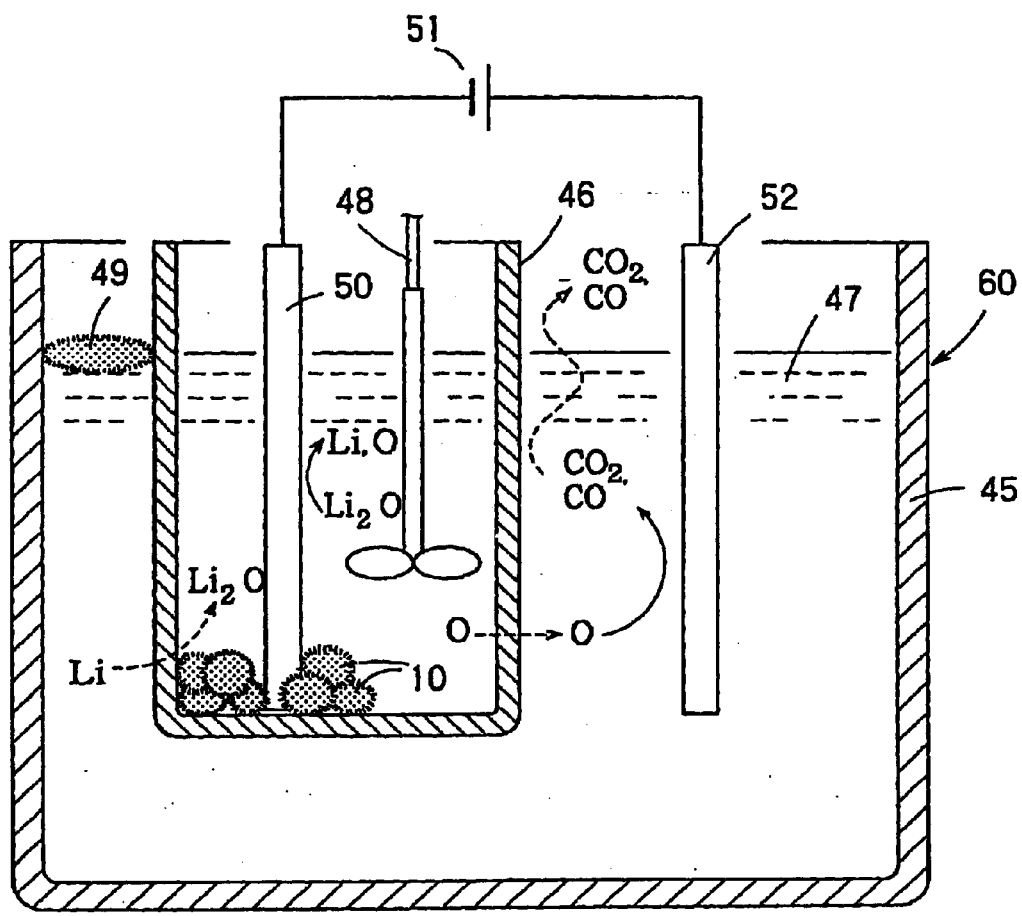
FIG. 14 is a schematic longitudinal sectional view of a reducing unit in a first modification of the reducing unit included in the waste treatment apparatus shown in FIG. 11.

FIG. 14 shows a reducing unit 60 in a first modification of the reducing unit 60 shown in FIG. 12. The reducing unit 60 in the first modification comprises, in addition to the components of the reducing unit 60 shown in FIG. 12, a reducing agent regenerating device for regenerating the reducing agent. The reducing agent regenerating device comprises a cathode 50 inserted in the waste container 46, an anode 52 (carbon electrode) inserted in the reaction vessel 45, and a power supply 51 for applying a voltage across the cathode 50 and the anode 52. Suppose that the reducing agent is Li. Lithium oxide ($Li_2O$) is produced by the reduction reaction of Li and the nuclear fuel materials adhering to the waste 10, and $Li_2O$ disperses in the waste container 46. Part of the $Li_2O$ is converted into Li and O at the cathode 50. Part of the thus regenerated Li is used for reduction and the rest disperses in the waste container 46. The Li dispersed in the waste container 46 does not contribute to reduction and hence efficient reduction cannot be achieved. A voltage that will not decompose a molten salt 46 contained in the reaction vessel 45, for example about 3 V, is applied across the cathode 50 and the anode 52 by the power supply 51. Consequently, Li, i.e., the reducing agent 49, supplied into the reaction vessel 45 penetrates the waste container 46 gradually, comes into contact with the nuclear fuel materials adhering to the waste 10 and reducing reaction progresses. Oxygen (O) generated when Li is regenerated at the cathode 50 disperses outside the waste container 46. The stirring device 48 disposed in the waste container 46 promotes the dispersion of O and the supply of O to the anode 52. The following electrode reactions occur at the electrodes during the foregoing processes.

$Li_2O \rightarrow 2Li^+ + O^{2-}$

Anode: $2O^{2-} + C \rightarrow CO_2 + 4e^-$ $O^{2-} + C \rightarrow CO + 2e^-$

Cathode: $Li^+ + e^- \rightarrow Li$

After the completion of the reducing reaction, the waste container 46 is raised and pulled out of the molten salt 47 contained in the reaction vessel 45.

Figure 15:
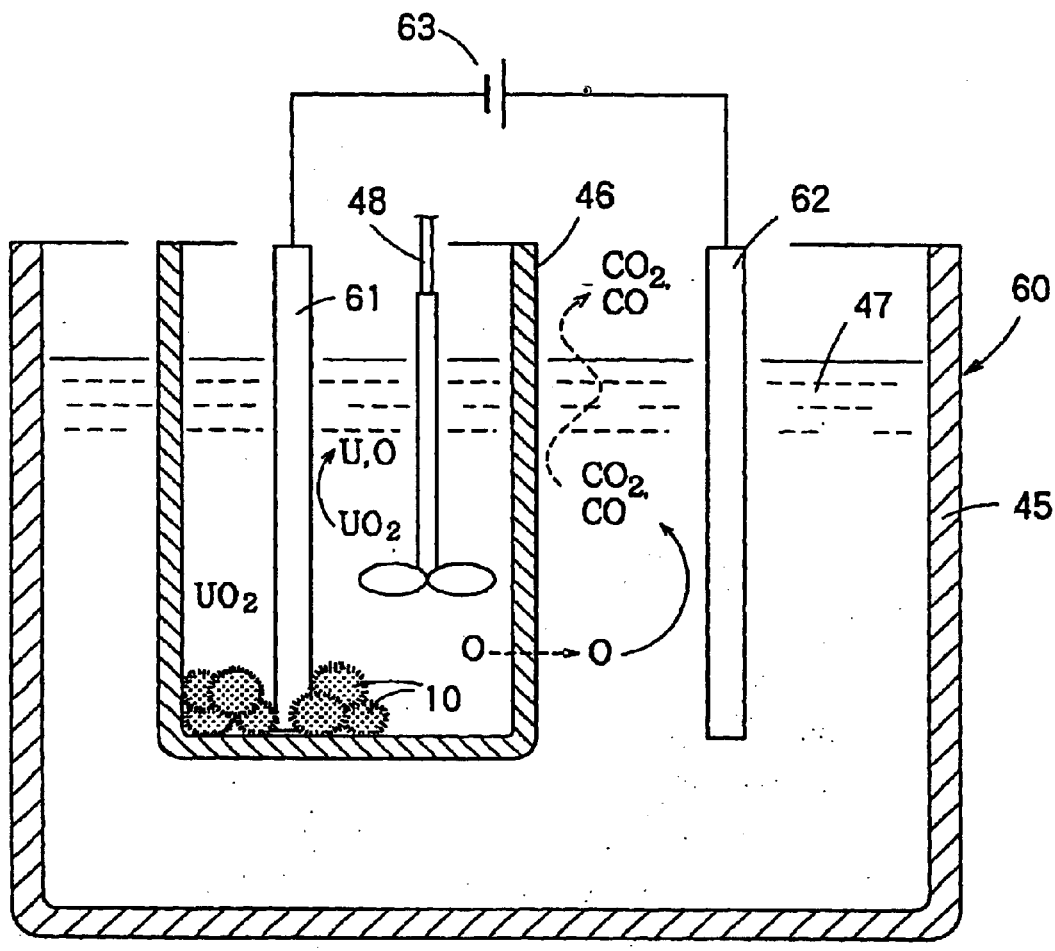
FIG. 15 is a schematic longitudinal sectional view of a reducing unit in a second modification of the reducing unit included in the waste treatment apparatus shown in FIG. 11.

FIG. 15 shows a reducing unit 60 in a second modification of the reducing unit 60 shown in FIG. 12. The reducing unit 60 shown in FIG. 15 has a cathode 61 and an anode 62 immersed in a molten salt 47. A voltage is applied across the cathode 61 and the anode 62 by a power supply 73 to reduce oxides dispersed in a molten salt 47 to metals by electrolytic reduction. A reducing reaction progresses in the molten salt 47 contained in a reaction vessel 45 of the reducing unit 60. Oxides, i.e., nuclear fuel materials, are reduced to metals U and TRU at the cathode 61, and O generated at the cathode 61 disperses outside a waste container 46. A stirring device 48 disposed in the waste container 46 promotes the dispersion of O and promotes the supply of O to the anode 62 (carbon electrode). The following reactions occur at the electrodes during the foregoing processes.

$UO_2 + 4e^- \rightarrow U + 2O^{2-}$

Anode: $2O^{2-} + C \rightarrow CO_2 + 4e^-$ $O^{2-} + C \rightarrow CO + 2e^-$

Cathode: $U^{4+} + 4e^- \rightarrow U$

After the completion of the reducing reaction, the waste container 46 is raised and pulled out of the molten salt 47 contained in the reaction vessel 45.

A waste treatment apparatus in a fourth embodiment according to the present invention for treating radioactive contaminated waste from a nuclear fuel handling facility, and a waste treatment method to be carried out by the same waste treatment apparatus will be described hereinafter. The waste treatment apparatus in the fourth embodiment is suitable for treating radioactive contaminated waste when the radioactive contaminated waste is an adsorbent, such as NaF, and the nuclear fuel materials adhering to the adsorbent are fluorides, such as $UF_6$, $UF_4$ and $UO_2F_2$.

Referring to FIG. 16, the waste treatment apparatus comprises a reducing unit 60 for reducing waste 100, a thermal melting unit 64 connected to the reducing unit 60, a molten salt electrolysis unit 65 connected to the thermal melting unit 64, a cleaning unit 66 connected to the molten salt electrolysis unit 65, a evaporative drying unit 67 connected to the cleaning unit 66 and an oxidizing unit 68 connected to the cleaning unit 66.

The reducing unit 60 reduces radioactive contaminated waste 100. The thermal melting unit 64 heats and melts the reduced waste 101 provided by reducing the radioactive contaminated waste 100 by the reducing unit 60. The molten salt electrolysis unit 65 subjects a molten salt 102, i.e., the molten waste provided by the thermal melting unit 64 to electrolysis. Thus, the molten waste prepared by melting the reduced waste 101 produced by reducing the radioactive contaminated waste 100 by the reducing unit 60 is used as the molten salt 102 for electrolysis. The cleaning unit 66 separates nuclear fuel materials (uranium metal) and an adsorbent (NaF) contained in a cathodic deposit 76 deposited on the cathode of the molten salt electrolysis unit 65. The evaporative drying unit 67 processes a used cleaning liquid 77 used by the cleaning unit 66 for evaporative drying to recover the adsorbent (NaF) dissolved in the used cleaning liquid 77. A cleaning liquid 78 recovered by evaporation is returned through a recovered cleaning liquid return line 79 to the cleaning unit 66 and is reused. The nuclear fuel materials (uranium metal) 80 separated from the adsorbent by the cleaning unit 66 is oxidized by the oxidizing unit 68, and oxides (Uranium oxide) 81 thus produced by the oxidizing unit 68 are collected.

As shown in FIG. 17, the molten salt electrolysis unit 65 comprises a reaction vessel 85 for containing the molten salt 102 prepared by melting the reduced waste 101, an anode 82 and a cathode disposed in the reaction vessel 85, and a power supply 84 for applying a voltage across the anode 82 and the cathode 83.

Figure 18:
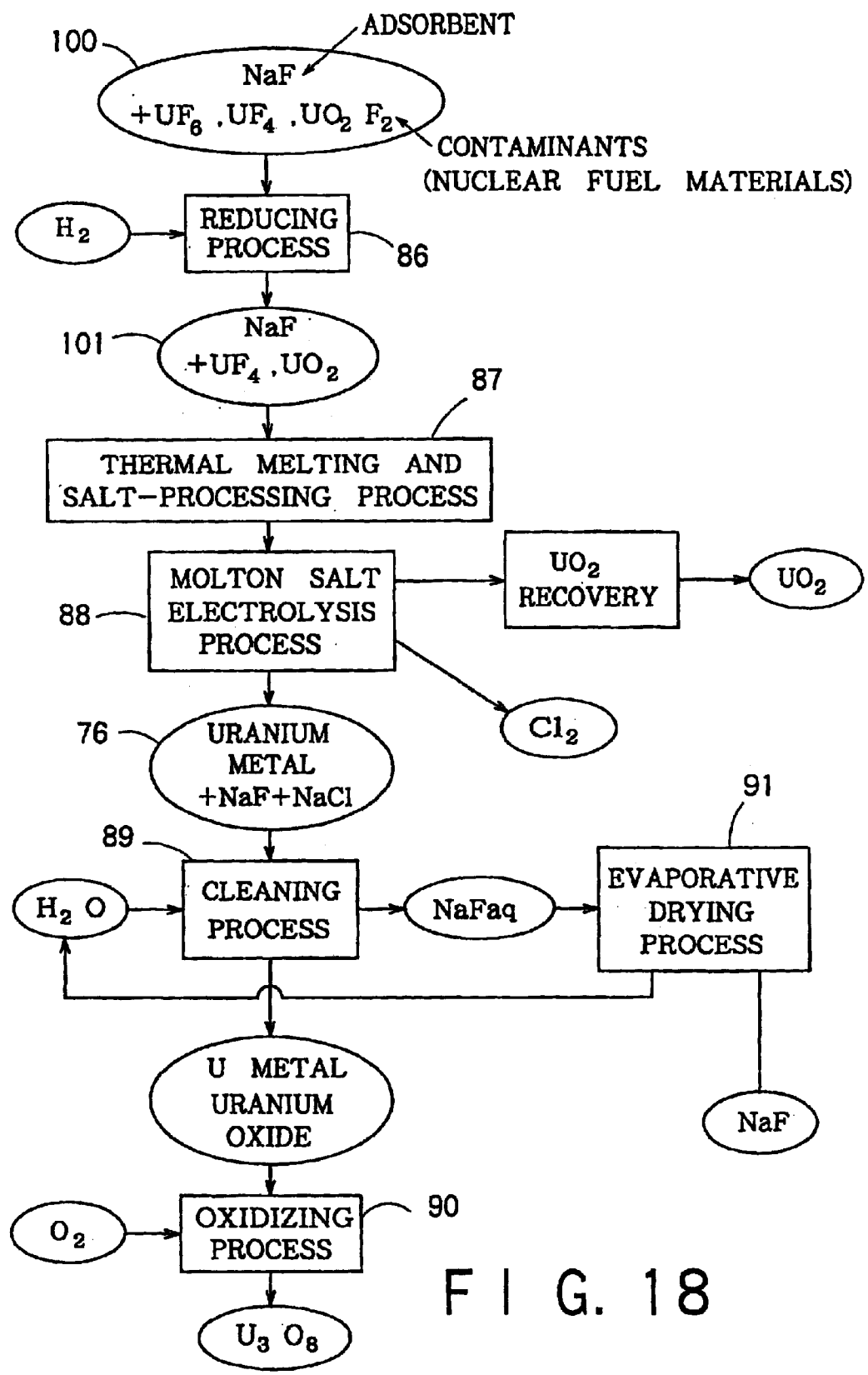
FIG. 18 is a flow chart of a waste treatment method to be carried out by the waste treatment apparatus in the fourth embodiment.
Figure 20:
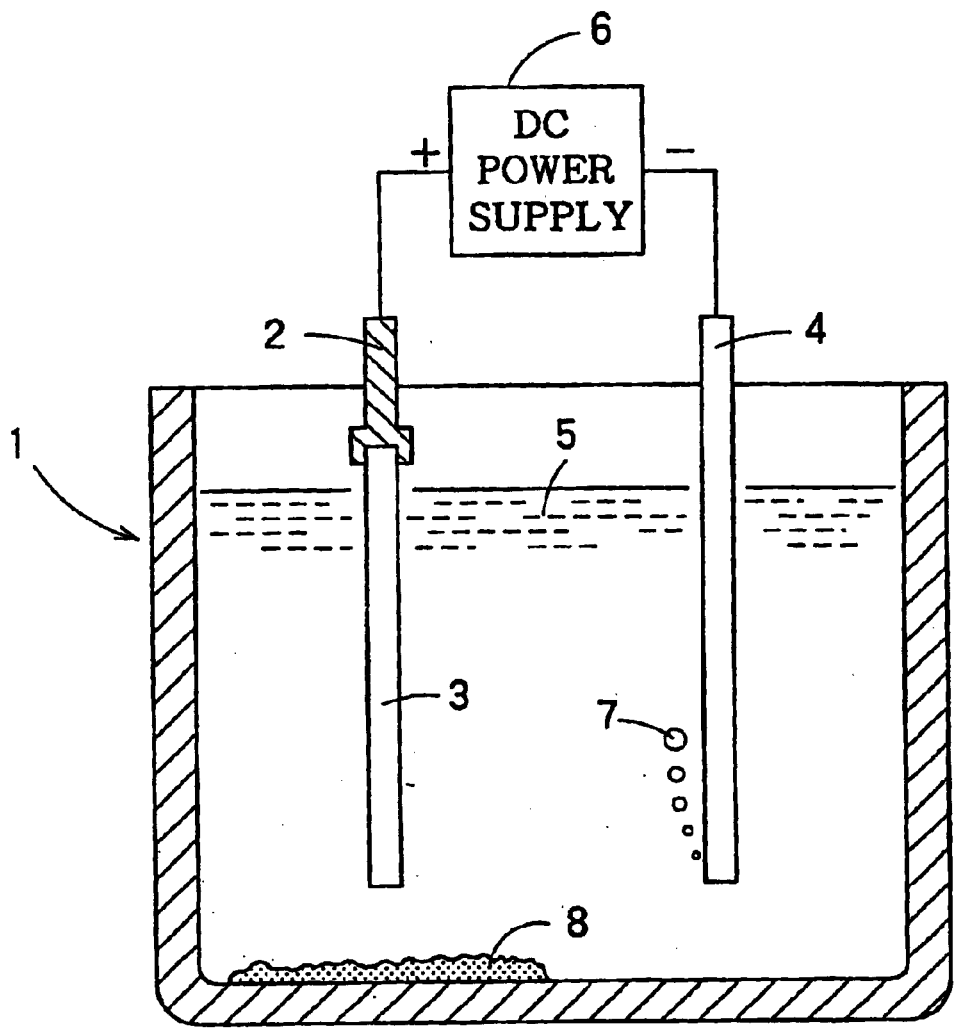
FIG. 20 is a schematic longitudinal sectional view of an electrolysis vessel of assistance in explaining a conventional electrolytic polishing for decontaminating a contaminated waste.

A waste treatment method to be carried out by the waste treatment apparatus in the fourth embodiment shown in FIGS. 16 and 17 will be described with reference to FIGS. 16 to 18. A reducing process 86 processes the radioactive contaminated waste 100, i.e., the adsorbent (NaF) contaminated with the nuclear fuel materials, such as $UF_6$, $UF_4$ and $UO_2F_2$, to reduce, for example, $UF_6$ (uranium hexafluoride) to $UF_4$ (uranium tetrafluoride). More concretely, a reducing gas, such as hydrogen gas, argon gas or phosgene gas, is spouted against adsorbent particles to reduce the nuclear fuel materials.

A thermal melting and salt-processing process 87 heats and melts the reduced waste 101, i.e., the adsorbent containing the reduced nuclear fuel materials by the thermal melting unit 64 and adds a fluoride or a hydride having the same cations as those of the reduced waste 101 to the molten waste 101 to produce a molten salt 102 having a low melting point. The chloride having the same cations as those of the reduced waste 101 is, for example, NaCl. When NaF and NaCl are mixed, a eutectic of NaF—NaCl having a melting point of 600° C. is produced. The melting point of this eutectic is lower than the melting point of 992° C. of NaF by 390° C.

In a molten salt electrolysis process 88, the anode 82 and the cathode 83 of the molten salt electrolysis unit 65 are immersed in the molten salt 102, and a voltage is applied across the anode 82 and the cathode 83 to reduce $UF_4$ to uranium metal. A cathodic deposit 76 containing uranium metal, NaF and NaCl is deposited on the cathode 83. The cathodic deposit 76 is recovered from the cathode 83. A cleaning process 89 cleans the cathodic deposit 76 with a cleaning liquid, such as water to separate uranium metal from other components of the cathodic deposit 76. An oxidizing process 90 oxidizes the thus recovered uranium metal to uranium oxide by the oxidizing unit 68. The uranium oxide is stable in the atmosphere. An evaporative drying process 91 heats and evaporates the used cleaning liquid 77 containing NaF by the evaporative drying unit 67 to recover the NaF. An evaporated cleaning liquid 78 is returned to the cleaning unit 66 and is reused.

As shown in FIG. 19, a waste treatment apparatus in a modification of the waste treatment apparatus shown in FIG. 16 heats and melts the radioactive contaminated waste 100 before the reducing process 86 to produce a molten salt 92, blows a reducing gas 93, such as hydrogen gas, argon gas or phosgene gas, through a nozzle 95 into the molten salt 92 contained in a vessel 94 to reduce the nuclear fuel materials within the molten salt 92. The nuclear fuel materials may be reduced by electrolytic reduction by immersing an anode and a cathode in the molten salt 92 and applying a voltage across the anode and the cathode. A chloride or the like is added to the molten salt after reduction and the reduced molten salt 92 is subjected to electrolysis by the molten salt electrolysis unit 65.

As apparent from the foregoing description, according to the present invention, electrically conductive waste contaminated with nuclear fuel materials from a nuclear fuel handling facility is immersed in a molten salt, the waste is connected to an anode and a surface layer of the waste is dissolved electrochemically in the molten salt. Thus, the nuclear fuel materials adhering to the waste can easily be removed.

Since the electrical resistance of the molten salt is very low as compared with that of an electrolytic water solution, an electric current flows uniformly over the surface of the waste. Consequently, the waste having a complicated shape, which is difficult to decontaminate by conventional techniques, can surely be decontaminated. Since the electrical resistance of the molten salt is low, a large current can be supplied through the molten salt without entailing abnormal heat generation to increase the process speed. The molten salt electrolysis process is safe because hydrogen is not generated at the cathode when the molten salt is used for the electrolysis.

The sludge of the nuclear fuel material accumulated in the molten salt can satisfactorily be separated from the molten salt by filtration because the surface tension of the molten salt is lower than that of an aqueous solution. The nuclear fuel material dissolved in the molten salt can be recovered in a cathodic deposit. The molten salt can be reused even if some nuclear fuel material dissolved in the molten salt remains in the molten salt.

The waste, such as the absorbent used in the nuclear fuel material handling facility, can be easily treated by reducing the nuclear fuel materials to metals, heating and melting the metals and the waste, and recovering the metals on the cathode in the molten salt electrolysis.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of treating electrically conductive waste contaminated with nuclear fuel materials from a nuclear fuel handling facility, which comprises:

a molten salt electrolysis process for removing the nuclear fuel materials adhering to a surface of the waste by immersing the waste in a molten salt to dissolve a surface layer of the waste electrochemically in molten salt without dissolving the nuclear fuel materials so as to provide a decontaminated electrically conductive waste; and a filtering process for filtering the molten salt used in the molten salt electrolysis process to extract the nuclear fuel materials removed from the surface of the waste and accumulated in the molten salt from the molten salt;

wherein the molten salt filtered in the filtering process is reused in the molten salt electrolysis process.

2. The method according to claim 1 further comprising an evaporation process for removing the molten salt adhering to a surface of the waste processed by the molten salt electrolysis process and taken out of the molten salt by heating the waste so that the molten salt adhering thereto evaporates;

wherein the molten salt recovered in the evaporation process is reused in the molten salt electrolysis process.

3. The method according to claim 1 further comprising:

a cleaning process for removing the molten salt adhering to the waste processed by the molten salt electrolysis process and taken out of the molten salt by a cleaning liquid; and an evaporative drying process for drying the molten salt contained in the cleaning liquid by evaporating the cleaning liquid used in the cleaning process;

wherein the molten salt recovered in the evaporative drying process is reused in the molten salt electrolysis process, and the cleaning liquid evaporated in the evaporative drying process is reused in the cleaning process.

4. The method according to claim 1, wherein the molten salt and the waste immersed in the molten salt are moved relative to each other in the molten salt electrolysis process to remove the nuclear fuel materials from the surface of the waste.

5. The method according to claim 4, wherein, in the molten salt electrolysis process, the waste is contained in a basket serving as an electrode for an electrolysis and the basket is vibrated in the molten salt.

6. The method according to claim 4, wherein, in the molten salt electrolysis process, the waste is contained in a basket serving as an electrode for an electrolysis and the basket is rotated in the molten salt.

7. The method according to claim 4, wherein, in the molten salt electrolysis process, the molten salt is spouted against the waste immersed in the molten salt.

8. The method according to claim 1, wherein, a liquid metal, which is in a liquid phase at a temperature high enough to maintain the molten salt in a molten state, is placed in the molten salt as an electrode for the molten salt electrolysis process.

9. The method according to claim 1 further comprising a reducing process for reducing the nuclear fuel materials to metals before subjecting the waste to the molten salt electrolysis process when the nuclear fuel materials are oxides.

10. The method according to claim 9, wherein, in the reducing process, the nuclear fuel materials are reduced to metals by making the nuclear fuel materials react with a reducing agent.

11. The method according to claim 10, wherein the reducing process comprises:

immersing the waste contaminated with the nuclear fuel materials in a reducing molten salt;

supplying a reducing agent into the reducing molten salt; and applying a voltage that will not cause a decomposition of the reducing molten salt across an anode and a cathode immersed in the reducing molten salt to regenerate the reducing agent reacted with the nuclear fuel materials.

12. The method according to claim 9, wherein the reducing process comprises:

immersing the waste contaminated with the nuclear fuel oxides in a reducing molten salt; and reducing the nuclear fuel materials to metals by applying a voltage across an anode and a cathode immersed in the reducing molten salt for an electrolytic reduction.

* * * * *